United States Patent
Shimamura et al.

(10) Patent No.: US 12,152,373 B2
(45) Date of Patent: Nov. 26, 2024

(54) CONTROL APPARATUS, WORK MACHINE, CONTROL METHOD, AND COMPUTER READABLE STORAGE MEDIUM

(71) Applicant: HONDA MOTOR CO., LTD., Tokyo (JP)

(72) Inventors: Hideaki Shimamura, Saitama (JP); Naoki Kameyama, Saitama (JP); Keiji Muro, Saitama (JP)

(73) Assignee: HONDA MOTOR CO.,LTD., Tokyo (JP)

( * ) Notice: Subject to any disclaimer, the term of this patent is extended or adjusted under 35 U.S.C. 154(b) by 1127 days.

(21) Appl. No.: 16/934,013

(22) Filed: Jul. 21, 2020

(65) Prior Publication Data
US 2020/0347581 A1 Nov. 5, 2020

Related U.S. Application Data

(63) Continuation of application No. PCT/JP2018/007659, filed on Feb. 28, 2018.

(51) Int. Cl.
*A01D 34/00* (2006.01)
*E02F 9/20* (2006.01)
(Continued)

(52) U.S. Cl.
CPC ............ *E02F 9/265* (2013.01); *E02F 9/2045* (2013.01); *E02F 9/205* (2013.01); *E02F 9/262* (2013.01); *G06N 7/01* (2023.01)

(58) Field of Classification Search
CPC .... A01D 34/008; A01B 79/005; A01B 69/008
See application file for complete search history.

(56) References Cited

U.S. PATENT DOCUMENTS 9,119,342 B2 9/2015 Bonefas
10,386,852 B2 8/2019 Shimamura
(Continued)

FOREIGN PATENT DOCUMENTS

EP 3479682 A1 5/2019
JP H0515231 A 1/1993
(Continued)

OTHER PUBLICATIONS

Office Action issued for counterpart Japanese Application No. 2020-503193, issued by the Japanese Patent Office on Dec. 7, 2021 (drafted on Nov. 29, 2021).
(Continued)

*Primary Examiner* — Jaime Figueroa
*Assistant Examiner* — Zachary Joseph Wallace

(57) ABSTRACT

A growing state of a plant is appropriately managed with a convenient method. For example, a control apparatus to control a work machine with an autonomous movement function includes an illuminance information obtaining section to obtain the illuminance information indicating at least one of (i) the illuminance of the work machine in motion and (ii) the illuminance of a region located on an advancing direction of the work machine in motion and a control section to control at least one of an advancing direction, an advancing speed, a work mode and a travel mode of the work machine based on the illuminance information obtained by the illuminance information obtaining section.

14 Claims, 10 Drawing Sheets

(51) Int. Cl.
*E02F 9/26* (2006.01)
*G06N 7/01* (2023.01)

(56) References Cited

U.S. PATENT DOCUMENTS

| | | | |
|---|---|---|---|
| 10,504,374 | B2 | 12/2019 | Itabashi |
| 11,297,755 | B2* | 4/2022 | Revelli ................. A01D 75/00 |
| 2011/0040409 | A1 | 2/2011 | Biber |
| 2016/0278287 | A1 | 9/2016 | Kasai |
| 2017/0131718 | A1* | 5/2017 | Matsumura .......... H04N 13/243 |
| 2017/0322550 | A1* | 11/2017 | Yokoyama ........... G05D 1/0022 |
| 2019/0138009 | A1 | 5/2019 | Saito |
| 2019/0145819 | A1* | 5/2019 | Takashima ................ G01J 3/51 356/425 |
| 2019/0150357 | A1* | 5/2019 | Wu ........................ H04N 7/188 |
| 2019/0187714 | A1* | 6/2019 | He ....................... A01D 34/008 |
| 2020/0084958 | A1* | 3/2020 | Reusch ................ H05B 47/105 |
| 2020/0323191 | A1* | 10/2020 | Duncan ................ G05D 1/0088 |

FOREIGN PATENT DOCUMENTS

| | | |
|---|---|---|
| JP | 2013025878 A | 2/2013 |
| JP | 2013223531 A | 10/2013 |
| JP | 2016185099 A | 10/2016 |
| JP | 2017126101 A | 7/2017 |
| JP | 2017182636 A | 10/2017 |
| JP | 2018007615 A | 1/2018 |
| JP | 2019087073 A | 6/2019 |

OTHER PUBLICATIONS (ISA/237) Written Opinion of the International Search Authority for International Patent Application No. PCT/JP2018/007659, issued/mailed by the Japan Patent Office on May 22, 2018.
Extended European Search Report for European Patent Application No. 18908191.2, issued by the European Patent Office on Dec. 4, 2020.

* cited by examiner

CONTROL APPARATUS, WORK MACHINE, CONTROL METHOD, AND COMPUTER READABLE STORAGE MEDIUM

The contents of the following international application are incorporated herein by reference:
NO. PCT/JP2018/007659 filed on Feb. 28, 2018.

BACKGROUND

1. Technical Field

The present invention relates to a control apparatus, a work machine, a control method, and a computer readable storage medium.

2. Related Art

In recent years, a work machine has been developed which estimates the self-location by utilizing a GPS signal and autonomously travels inside a predetermined region (for example, see Patent document 1 or 2).

PRIOR ART DOCUMENT

Patent Document

[Patent document 1] Japanese Unexamined Patent Application, Publication No. 2016-185099
[Patent document 2] Japanese Unexamined Patent Application, Publication No. 2013-223531

DESCRIPTION OF EXEMPLARY EMBODIMENTS

Figure 1:
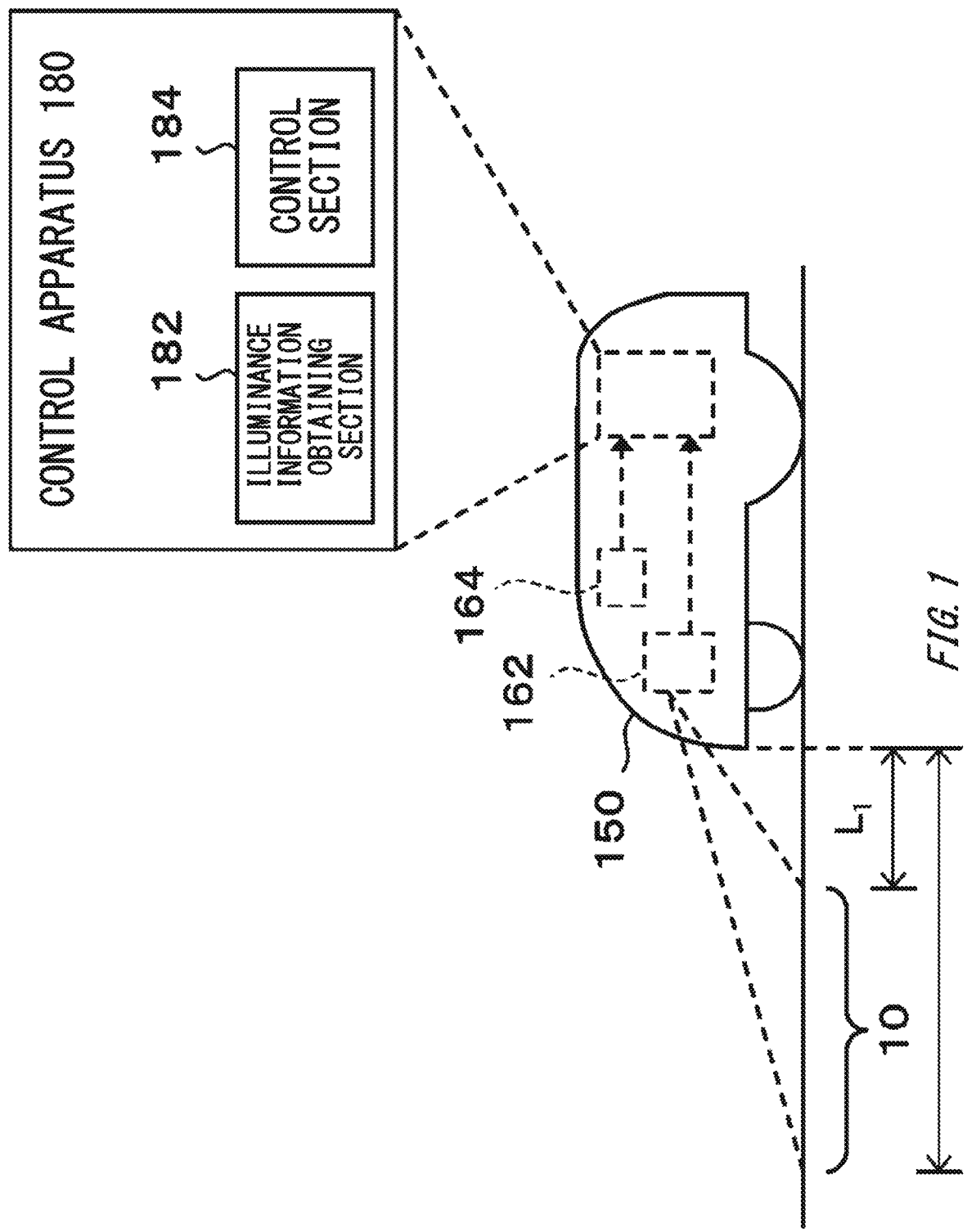
FIG. 1 schematically shows one example of the internal configuration of a work machine 150.

Hereinbelow, the present invention will be described through embodiments of the invention, but the following embodiments do not limit the invention disclosed in claims. In addition, not all combinations of features described in the embodiments are necessarily essential to the solution of the invention. Note that in the drawings, the same reference numbers may be applied to the same or similar portions and the redundant descriptions may be omitted in some cases. In addition, two or more elements which each have the same name and have different reference numbers may have the configuration similar to each other as long as there is no technically serious contradiction.

[Outline of the Work Machine 150]

FIG. 1 schematically shows one example of an internal configuration of the work machine 150. In the present embodiment, the work machine 150 includes, for example, the illuminance sensor 162, the illuminance sensor 164, and the control apparatus 180. In the present embodiment, the control apparatus 180 includes, for example, the illuminance information obtaining section 182 and the control section 184.

The work machine 150 may be one example of the work machine. The illuminance sensor 162 and the illuminance sensor 164 may be one example of the illuminance sensor. The control apparatus 180 may be one example of the control apparatus. The illuminance sensor 162, the illuminance sensor 164, and the illuminance information obtaining section 182 may be one example of the illuminance information obtaining section. The control section 184 may be one example of the control section.

In the present embodiment, the work machine 150 has an autonomous movement function. In the present embodiment, the work machine 150 performs any works. The work machine 150 performs, for example, a predetermined work while autonomously moving inside a region specified by a user. The work machine 150 may detect a boundary of the above-described region based on data output from at least one of the internal sensor and the external sensor mounted on the work machine 150. The work machine 150 may estimate the self-location based on data output from at least one of the internal sensor and the external sensor mounted on the work machine 150.

The type of work performed by the work machine 150 is not specifically limited. The above-described work may be a work whose work intensity is preferably adjusted according to the illuminance in each location within the work region. More specifically, examples of a type of the work include (i) civil engineering work, (ii) construction work, (iii) cultivation work for plant or agricultural product, (iv) snow clearing work, and the like. Examples of a cultivation work include seeding, pruning, lawn mowing, grass cutting, watering, fertilizing, soiling, weeding, and the like.

In the present embodiment, the illuminance sensor 162 measures the illuminance of the region 10 located on the advancing direction of the work machine 150. Thereby, the illuminance sensor 162 can obtain the illuminance information indicating the illuminance of the region 10. The illuminance of the region 10 may be the illuminance in any location inside the region 10 or may be the statistical value of the illuminance in a plurality of locations inside the region 10. Examples of the statistical value include an average value, a median value, a mode value, and the like. The illuminance sensor 162 outputs the illuminance information indicating the illuminance of the region 10. For example, the illuminance sensor 162 transmits the illuminance information indicating the illuminance of the region 10 to the control apparatus 180.

The illuminance sensor 162 (i) may include a light detection apparatus including a light receiving device such as a photodiode, or (ii) may include an image-capturing apparatus including an image capturing device such as CCD and CMOS. The image-capturing apparatus may be a visible light camera or may be an infrared camera. The illuminance sensor 162 may include one or more light detection apparatuses. The light detection apparatus may include one or more light receiving devices. The illuminance sensor 162 may include one or more image-capturing apparatuses. The image-capturing apparatus may include one or more image capturing devices.

In an embodiment shown in FIG. 1, the illuminance sensor 162 obtains the information indicating the illuminance of the region 10 located ahead in the advancing direction of the work machine 150 in motion. The shape and size of the region 10 is not specifically limited. The relative location of the region 10 and the work machine 150 is not specifically limited. At least one of the shape and size of the region 10 and the relative location between the region 10 and the work machine 150 are determined based on settings of a parameter which defines a measuring range of the illuminance sensor 162.

The minimum value $L_1$ [m] of the distance between the end of the work machine 150 and the region 10 may be set to a value corresponding to a moving speed of the work machine 150. The maximum value $L_2$ [m] of the distance between the end of the work machine 150 and the region 10 may be set to a value according to at least one of the moving speed of the work machine 150 and the size of the work machine 150. It is noted that, the following relationship may be satisfied: $L_2 > L_1 > 0$. For a size of the region 10, the maximum value of the distance along the advancing direction of the work machine 150 may be referred to as a length of the region 10 in some cases. For a size of the region 10, the maximum value of the distance along the direction parallel to the horizontal direction perpendicular to the advancing direction of the work machine 150 may be referred to as the width of the region 10 in some cases.

In the present embodiment, the illuminance sensor 164 measures the illuminance of the work machine 150. Thereby, the illuminance sensor 164 can obtain the illuminance information indicating the illuminance of the work machine 150. The illuminance of the work machine 150 may be the illuminance in any location on the top surface of the work machine 150, or may be the illuminance in any location on a surface other than the bottom surface of the work machine 150. The illuminance of the work machine 150 may be the statistical value of the illuminance in a plurality of locations of the work machine 150. Examples of the statistical value include an average value, a median value, a mode value, and the like. The illuminance sensor 164 outputs the illuminance information indicating the illuminance of the work machine 150. For example, the illuminance sensor 164 transmits the illuminance information indicating the illuminance of the work machine 150 to the control apparatus 180.

The illuminance sensor 164 (i) may include a light detection apparatus including a light receiving device such as a photodiode, or (ii) may include an image-capturing apparatus including an image capturing device such as CCD and CMOS. The image-capturing apparatus may be a visible light camera or may be an infrared camera. The illuminance sensor 164 may include one or more light detection apparatuses. The light detection apparatus may include one or more light receiving devices. The illuminance sensor 164 may include one or more image-capturing apparatuses. The image-capturing apparatus may include one or more image capturing devices.

In the present embodiment, the control apparatus 180 controls the work machine 150. The control apparatus 180 may control the movement of the work machine 150. The control apparatus 180 may control the work of the work machine 150. In the present embodiment, the control apparatus 180 controls at least one of (i) an advancing direction, (ii) an advancing speed, (iii) a travel mode, (iv) a work mode of the work machine 150 based on at least one of (i) the illuminance of the work machine 150 and (ii) the illuminance of the region 10.

The travel mode defines at least one of (i) the travel pattern and (ii) the distance between the travel paths. Examples of the travel pattern include (i) a travel pattern along a path on which locational coordinates of a plurality of points are predetermined, (ii) a travel pattern along a path whose shape and size are defined by a predetermined function, (iii) a travel pattern along a boundary of a work region, (iv) a travel pattern on a path whose shape is similar to a boundary shape of the work region, (v) a travel pattern on a path having a spiral shape from the boundary side of the work region toward the center side, (vi) a travel pattern on a path having a spiral shape from the center side of the work region toward the boundary side, (vii) a travel pattern on a path having a zigzag shape, (viii) a travel pattern on a path having a square wave shape, (ix) a travel pattern to, after arriving any boundary, turn toward a direction determined based on any probability model (for example a direction determined randomly) and continue to travel, (x) a travel pattern while straight moving and turning are repeated such that a plurality of parallel paths are arranged without gaps or with predetermined gap, and the like.

The work mode defines at least one of (i) whether the work can be performed, and (ii) the work intensity. Examples of the work mode include (i) a mode in which a work is performed during a moving period, (ii) a mode in which a work is stopped or suspended during a moving period, (iii) a mode in which a work is performed during a straight moving period, but a work is stopped or suspended during a turning operation, and the like. Other examples of the work mode include (i) a mode in which the work intensity is relatively large, (ii) a mode in which the work intensity is moderate, (iii) a mode in which the work intensity is relatively small, and the like.

Examples of the work intensity include a work frequency in a particular period, a work amount per work, a total work amount in a particular period, and the like. The work intensity may be represented with continuous numerical values or may be represented with a stepwise segmentation. Each segment may be distinguished with symbols or characters, or may be distinguished with numbers.

Other examples of the work mode include (iv) a mode to return to the home station, (v) a mode to move from the home station to the location where the intended work starts, and the like. The home station may be a location where the work machine 150 waits or is accommodated. At the home station, a replenishing apparatus which replenishes energy or consumables to the work machine 150 may be arranged. The home station may be placed inside the work region of the work machine 150, or may be placed outside the work region.

In the present embodiment, the illuminance information obtaining section 182 obtains the measurement data output from at least one of the illuminance sensor 162 and the illuminance sensor 164. For example, the illuminance information obtaining section 182 obtains the illuminance information indicating the illuminance of the region 10 from the illuminance sensor 162. Also, the illuminance information obtaining section 182 obtains the illuminance information indicating the illuminance of the work machine 150 from the illuminance sensor 164. The illuminance information obtaining section 182 may transmit the obtained illuminance information to the control section 184.

In the present embodiment, the control section 184 controls at least one of an advancing direction, an advancing speed, a travel mode, and a work mode of the work machine 150 based on the illuminance information obtained by the illuminance information obtaining section 182. For example, the control section 184 receives illuminance information as an input and outputs a parameter to control at least one of an advancing direction, an advancing speed, a travel mode, and a work mode of the work machine 150.

In one embodiment, the control section 184 determines an advancing direction of the work machine 150 such that a region with a higher illuminance has a higher frequency with which the work machine 150 enters. In another embodiment, the control section 184 determines a work mode of the work machine 150 such that a region with a higher illuminance has higher work intensity. The above-described illuminance may be a measured value at a moment when the work machine 150 is moving or working, or may be a value calculated by using a statistical method to analyze the illuminance information obtained in a particular period.

According to the present embodiment, the work machine 150 can adjust at least one of the work frequency and the work intensity according to, for example, the illuminance in each location within the work region. For example, the growing speed of the plant is proportional to the intensity of solar radiation and the amount of water supply. Therefore, in a case where the work machine 150 is utilize for a growth of a plant, growing speeds of the plants are different depending on the location within the work region if the sunshine conditions are different depending on a location within the work region.

In this case, examples of the method to manage a growing condition of the plant within the work region include (i) learning the growing condition of the plant based on the output from various types of sensors arranged within the work region or the various types of sensors mounted on the work machine 150, and (ii) adjusting the work intensity of the work machine 150 according to the growing condition. However, it is time-consuming to learn a growing condition of the plant based on the output from the various types of sensors, and the analysis work is also relatively difficult.

In contrast, according to the present embodiment, the control apparatus 180 controls the operation of the work machine 150 based on the illuminance in each location within the work region. Analyzing the illuminance in each location within the work region is much easier than analyzing the growing condition of the plant in each location of the work region. Therefore, according to the present embodiment, the control apparatus 180 can appropriately manage at least one of the frequencies and the intensity of the work of the work machine 150 in a particular region using a convenient method.

It is noted that the control section 184 may control at least one of an advancing direction, an advancing speed, a travel mode, and a work mode of the work machine 150 based on (i) the remaining energy of the work machine 150, (ii) the presence or absence of the faulty or error which occurs in the work machine 150 and the content thereof, (iii) a progress status of the work, (iv) whether the condition regarding time is satisfied. and (v) the combination thereof, instead of the above-described illuminance or in addition to the above-described illuminance Examples of the condition regarding time include (a) whether a predetermined time or period is reached, (b) for each work, whether the interval of the work or the duration of the work is longer than a predetermined value or shorter than a predetermined value, (c) for a plurality of works in the past, whether a statistical value regarding the interval of the work or the duration of the work is larger than a predetermined value or smaller than a predetermined value, and the like.

In the present embodiment, an embodiment has been described in which the illuminance sensor 162 and the illuminance sensor 164 are mounted on the work machine 150. However, the illuminance sensor 162 and the illuminance sensor 164 are not limited to the present embodiment. In another embodiment, at least one of the illuminance sensor 162 and the illuminance sensor 164 may be arranged outside the work machine 150. At least one of the illuminance sensor 162 and the illuminance sensor 164 may be fixed at a location where the work machine 150 can be observed, or may be arranged on a moving object different from the work machine 150.

In the present embodiment, an embodiment has been described in which the control apparatus 180 is mounted on the work machine 150. However, the control apparatus 180 is not limited to the present embodiment. In another embodiment, the control apparatus 180 may be arranged outside the work machine 150. The control apparatus 180 may be the information processing apparatus which can transmit and receive information with the work machine 150 via the communication network.

[Specific Configuration of Each Portion of Work Machine 150]

Each portion of the work machine 150 may be realized by hardware, may be realized by software, or may be realized by hardware and software. If at least some of components constituting the work machine 150 (for example, the control apparatus 180) are realized by software, the components realized by the software may be realized by activating, in an information processing apparatus having a general configuration, a program stipulating operations about the components.

The above-described information processing apparatus may include: (i) a data processing apparatus having processors such as a CPU or a GPU, a ROM, a RAM, a communication interface and the like, (ii) an input apparatus such as a keyboard, touch panel, camera, microphone, various types of sensors or GPS receiver, (iii) an output apparatus such as a display apparatus, a speaker or a vibration apparatus, and (iv) a storage apparatus (including an external storage apparatus) such as a memory or a HDD. In the above-described information processing apparatus, the above-described data processing apparatus or a storage apparatus may store the above-described program. The above-described program causes the information processing apparatus described above to perform the operations defined by this program, by being executed by the processor. The above-described program may be stored in a non-transitory computer readable recording medium.

The above-described program may be a program to allow a computer to serve as the control apparatus 180. The above-described computer may be a computer which provides a cloud service or may be a computer which realizes a client server system. The above-described computer (i) may be a computer mounted on the work machine 150, or (ii) may be a computer which is outside of the work machine 150 and controls the work machine 150 via the communication network.

The above-described program may be a program which allows a computer to perform one or more procedures related to various types of information processing in the control apparatus 180. One or more procedures regarding various types of information processing in the control apparatus 180 may be a procedure to control the work machine 150. A procedure to control the work machine 150 includes, for example, an illuminance information obtaining step to obtain the illuminance information indicating at least one of (i) the illuminance of the work machine 150 in motion and (ii) the illuminance of the region 10 located on the advancing direction of the work machine 150 in motion. A procedure to control the work machine 150 may include a controlling step to control at least one of an advancing direction, an advancing speed, a travel mode, and a work mode of the work machine 150 based on the illuminance information obtained in the illuminance information obtaining step.

[Outline of the Management System 200]

Figure 2:
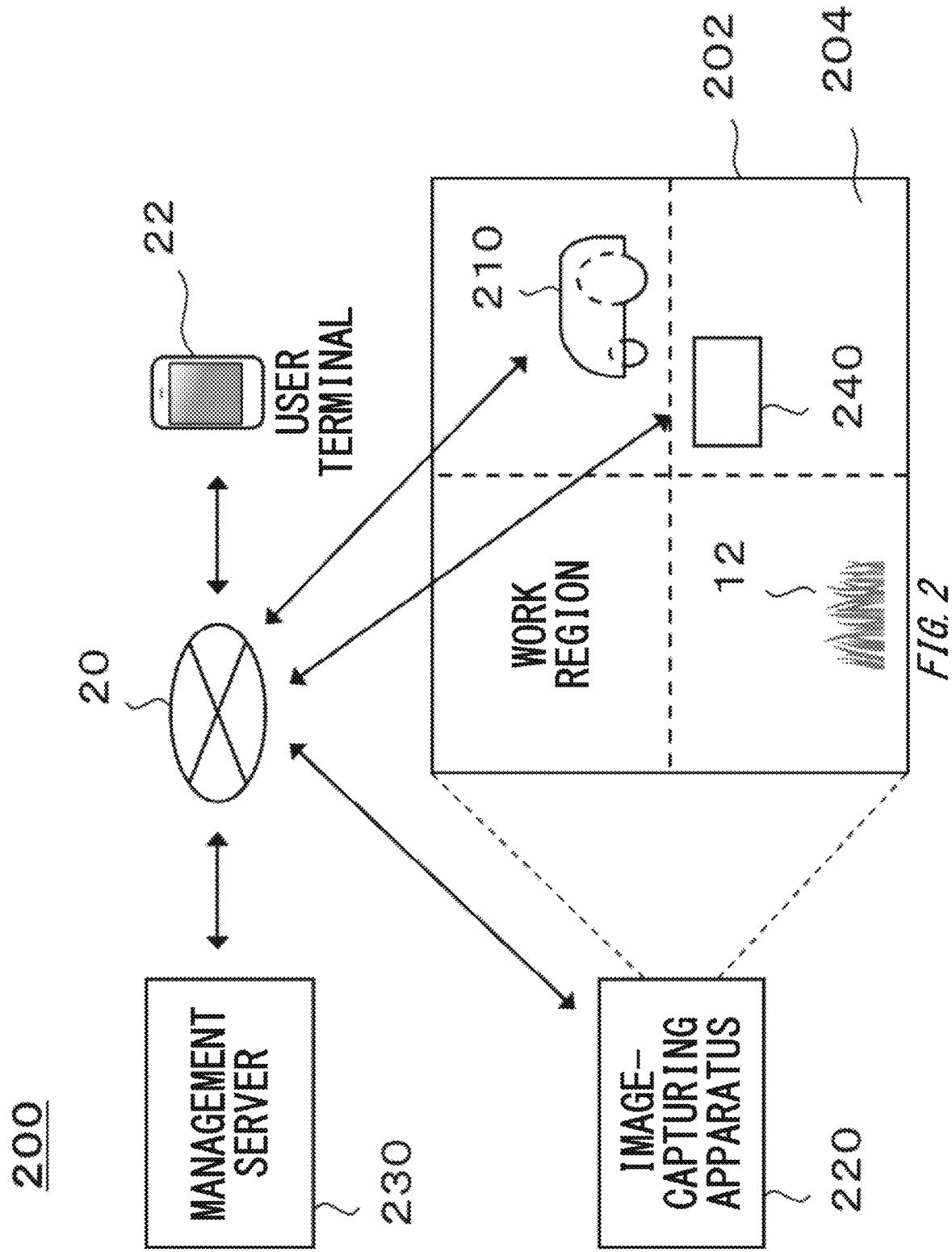
FIG. 2 schematically shows one example of a system configuration of the management system 200.

FIG. 2 schematically shows one example of the system configuration in the management system 200. In the present embodiment, the management system 200 includes one or more lawn mowers 210, one or more image-capturing apparatuses 220, the management server 230, and one or more watering apparatuses 240. The management system 200 may include one or more user terminals 22.

In the present embodiment, for easy description, the management system 200 is described in detail by using an example where the management server 230 utilizes the image data captured by the lawn mower 210 and the image-capturing apparatus 220 to determine the sunshine condition in each location inside the work region 202 where the lawn 12 is cultivated. However, the management system 200 is not limited to the present embodiment. In another embodiment, at least one of the user terminal 22, the lawn mower 210, the image-capturing apparatus 220, the management server 230 and the watering apparatus 240 may utilize the image data captured by at least one of the lawn mower 210 and the image-capturing apparatus 220 to determine the sunshine condition in each portion inside the work region 202.

In the present embodiment, for an easy description, the management system 200 is described in detail by using an example where the lawn mower 210 has an autonomous movement function and the computer mounted on the lawn mower 210 controls the operation of the lawn mower 210. However, the management system 200 is not limited to the present embodiment. In another embodiment, at least one of the user terminal 22, the image-capturing apparatus 220, the management server 230, and the watering apparatus 240 may control the operation of the lawn mower 210.

The lawn 12 may be one example of the plant. The lawn mower 210 may be one example of the work machine. At least one of the user terminal 22, the lawn mower 210, the image-capturing apparatus 220, the management server 230, and the watering apparatus 240 may be one example of the control apparatus.

In the present embodiment, a work to grow the lawn 12 is performed inside the work region 202. The location and range of the work region 202 is not specifically limited. The range of the region may represent the size and shape of the region. The work region 202 may have any geographic range. The work region 202 may have a predetermined geographic range. Examples of the type of work to grow the lawn 12 include seeding, pruning, lawn mowing, grass cutting, watering, fertilizing, soiling, weeding, and the like. According to the present embodiment, the lawn mower 210 having an autonomous travel function performs the lawn mowing while moving inside the work region 202.

In the present embodiment, a plurality of subareas 204 is included inside the work region 202. The subarea 204 may include a region which is separated by a physical geographical boundary or may be an region which is separated by a virtual geographical boundary.

Examples of the physical geographical boundary include (i) a boundary defined by a structure formed naturally or artificially, (ii) a boundary defined by sprayed chemicals, (iii) a boundary defined by electromagnetic wave such as visible light, infrared light, ultraviolet light, and the like, (iv) a boundary defined by magnetic field, (v) a boundary defined by acoustic wave or ultrasonic sound wave, and the like. Examples of a structure formed naturally include a dent, a step, a slope, lake and reservoir, river, and the like. Examples of a structure formed artificially include a lane, a groove, a tunnel, a building, wire, a rope, a fence, a net, a Braille block, and the like. Examples of the virtual geographical boundary include a geofence, a virtual wire, and the like. The virtual wire may be a geographical boundary defined by a virtual line set among a plurality of structures.

The quantity of the subarea 204 included inside the work region 202 and a size and shape of the subarea 204 are not specifically limited. However, a plurality of the subareas 204 is preferably arranged uniformly inside the work region 202 such that there is no overlapped placement and no lack of placement. The plurality of subareas 204 may each have the same size or different size. The plurality of subareas 204 may each have the same shape or different shape.

The quantity of the subarea 204 arranged inside the work region 202 may be constant or variable. For example, a quantity of the subareas 204 arranged in a particular region which constitutes a part of the work region 202 is changed in response to occurrence of a predetermined event. Specifically, a plurality of the subareas 204 which is arranged adjacent to each other may be virtually combined to form a single subarea 204. The single subarea 204 may be virtually divided into a plurality of the subareas 204 which is arranged adjacent to each other. The quantity of the subarea 204 arranged in a particular region inside the work region 202 may be adjusted according to a required precision.

Each portion of the management system 200 may transmit and receive information with each other. For example, the lawn mower 210 transmits and receives information with at least one of the user terminal 22 and the management server 230 via the communication network 20. The lawn mower 210 may transmit and receive information with at least one of the image-capturing apparatus 220 and the watering apparatus 240 via the communication network 20.

The image-capturing apparatus 220 may transmit and receive information with at least one of the user terminal 22, the lawn mower 210, and the management server 230 via the communication network 20. The watering apparatus 240 may transmit and receive information with at least one of the user terminal 22, the lawn mower 210, and the management server 230 via the communication network 20.

In the present embodiment, the communication network 20 may be a wired communication transmission path, a wireless communication transmission path, or a combination of a wireless communication transmission path and a wired communication transmission path. The communication network 20 may include a wireless packet communication network, the Internet, a P2P network, a private line, a VPN, an electric power line communication line and the like. The communication network 20: (i) may include a mobile communication network such as a mobile phone line network; and (ii) may include a wireless communication network such as a wireless MAN (for example, WiMAX (registered trademark)), a wireless LAN (for example, WiFi (registered trademark)), Bluetooth (registered trademark), Zigbee (registered trademark) or NFC (Near Field Communication).

In the present embodiment, the user terminal 22 is a communication terminal utilized by a user of the management system 200 or the lawn mower 210, but the detail thereof is not specifically limited. Examples of the user terminal 22 include a personal computer, a mobile terminal, and the like. Examples of the mobile terminal include a mobile phone, a smartphone, a PDA, a tablet, a notebook computer, a laptop computer, a wearable computer, or the like.

In the present embodiment, the management system 200 manages the work region 202. For example, the management system 200 may manage a state of the object (also referred to as work target in some cases) on which a work is to be performed in the work region 202. The lawn 12 may be one example of the work target. The management system 200 may manage the work performed in the work region 202. For example, the management system 200 manages the schedule of the work. The work schedule may be the information which defines at least one of a period when the work is performed, a place where the work is performed, an entity which performs the work, a work target, and a content of the work.

In the present embodiment, the management system 200 manages the lawn mower 210. The lawn mower 210 may be one example of an entity which performs the work. For example, the management system 200 manages a state of the lawn mower 210. For example, the management system 200 manages a location, an advancing direction, an advancing speed, a travel mode, a work mode, a remaining energy (for example a remaining battery level) of the lawn mower 210, the schedule of the work performed by the lawn mower 210, and the like.

In the present embodiment, the management system 200 manages the image-capturing apparatus 220. For example, the management system 200 controls at least one of the image-capturing direction and the image-capturing condition of the image-capturing apparatus 220. Examples of the image-capturing condition include a zoom magnification, an aperture, whether an optical filter exists or whether an optical filter is needed, a type of an optical filter, a resolution, a shatter speed, a frame rate, an ISO sensitivity, a capturing altitude, an angle of view, a focal length, a render settings, and the like. The image-capturing condition may include the information indicating the weather condition during the image-capturing.

In the present embodiment, the management system 200 manages the watering apparatus 240. For example, the management system 200 manages the schedule of the watering work which is performed by the watering apparatus. The schedule of the watering work may be the information which defines at least one of the time when the watering work starts, a direction of watering. a period for which one watering work is performed, and an amount of water supply during the watering work.

It is noted that, in the present embodiment, for an easy description, the management system 200 is described in detail using an embodiment in which the management system 200 manages the lawn mower 210, the image-capturing apparatus 220 and the watering apparatus 240 as an example. However, the management system 200 is not limited to the present embodiment. In another embodiment, the management system 200 may not manage at least one of the lawn mower 210, the image-capturing apparatus 220, and the watering apparatus 240. In yet another embodiment, the management system 200 may manage another type of work machine different from the lawn mower 210, the image-capturing apparatus 220, and the watering apparatus 240. Examples of the work performed by another type of work machine include seeding, pruning, fertilizing, soiling, weeding, snow clearing, cleaning, carrying, monitoring, security, guarding, and the like.

[Outline of Each Portion of Management System 200]

In the present embodiment, the lawn mower 210 has an autonomous movement function, and autonomously travels inside the work region 202. It is noted that the lawn mower 210 may move according the remote control by a user. The lawn mower 210 cuts the lawn 12 growing inside the work region 202. The lawn mower 210 may travel while cutting the lawn 12, or may travel without cutting the lawn 12. The lawn mower 210 will be described in detail later.

The lawn mower 210 may be one example of the work machine (which is also referred to as work machine in some cases). The work machine may not be limited to the lawn mower 210. The work machine may be a moving object which travels on the ground, may be a moving object which flies in the air, or may be a moving object which navigates under the water or on the water. Examples of another work machine include a drone, a helicopter, airship which fly in the air, and the like. The above-described work machine may include an autonomous movement function.

In the present embodiment, the image-capturing apparatus 220 is placed inside or in the vicinity of the work region 202. The image-capturing apparatus 220 may capture an image of at least a part of the work region 202. The image may be a video image or may be a static image. The image may be a wide angle image, or may be a 180 degree panoramic image or may be a 360 degree panoramic image. The image may be an image captured by a visible light camera, or an image captured by an infrared camera.

The image-capturing apparatus 220 may transmit data of the captured image to the management server 230. The image-capturing apparatus 220 may transmit the information indicating at least one of the image-capturing direction and the image-capturing condition to the management server 230. The detail of the image-capturing condition may be the same as the above-described detail. The image-capturing apparatus 220 may perform various types of processes based on a control signal from the management server 230. Examples of the above-described process include starting an image-capturing, stopping an image-capturing, adjusting or changing an image-capturing direction, adjusting or changing an image-capturing condition, saving an image data, transmitting an image data, and the like.

The image-capturing apparatus 220 may include an equipment to measure the weather condition in the location where the image-capturing apparatus 220 is placed. Examples of the weather condition include a temperature, a humidity, a wind speed, a wind direction, an illuminance, and the like. The image-capturing apparatus 220 may transmit the information indicating the weather condition in the location where the image-capturing apparatus 220 is placed to the management server 230.

The image-capturing apparatus 220 may include equipment to measure at least one of the amount of solar radiation and the illuminance in a location where the image-capturing apparatus 220 is placed. The image-capturing apparatus 220 may transmit the information indicating at least one of the amount of solar radiation and the illuminance in a location where the image-capturing apparatus 220 is placed to the management server 230.

In the present embodiment, the management server 230 manages the various types of information related to the work region 202. For example, the management server 230 manages the information which associates the area identification information identifying each of the plurality of subareas 204 and the illuminance parameter indicating the sunshine condition of the subarea 204 identified by the area identification information (also referred to as map information in some cases). The management server 230 may perform a process such as generating, updating, deleting, searching of the map information, and the like. The illuminance parameter may be one example of the information indicating the sunshine condition.

The management server 230 may manage the state of equipment which configures the management system 200. The management server 230 may control the operation of the equipment which configures the management system 200. The management server 230 may manage the growing condition of the lawn 12. The management server 230 may manage various types of work to be performed in the work region 202. For example, the management server 230 creates a schedule of the above-described various types of work. The management server 230 may manage the progress of schedule of the above-described various types of work. The management server 230 will be described in detail later.

In the present embodiment, the watering apparatus 240 supplies water to the work region 202. The watering apparatus 240 may supply the water in which a fertilizer component is resolved to the work region 202. The watering apparatus 240 may include a sprinkler to spray water inside the work region 202. The watering apparatus 240 may perform a watering work based on the control signal from the management server 230.

The watering apparatus 240 may include the equipment to measure the weather condition in a location where the watering apparatus 240 is placed. Examples of the weather condition include a temperature, humidity, a wind speed, a wind direction, and the like. The watering apparatus 240 may transmit the information indicating the weather condition in the location where the watering apparatus 240 is placed to the management server 230.

The watering apparatus 240 may include equipment to measure at least one of the amount of solar radiation and the illuminance in the location where the watering apparatus 240 is placed. The watering apparatus 240 may transmit the information indicating at least one of the amount of solar radiation and the illuminance in the location where the watering apparatus 240 is placed to the management server 230.

[Specific Configuration of the Each Portion of the Management System 200]

Each portion of the management system 200 may be realized by the hardware, may be realized by the software, or may be realized by the hardware and software. At least a part of each portion in the management system 200 may be realized by a single server, or realized by a plurality of servers. At least a part of each portion in the management system 200 may be realized on a virtual server or a cloud system. At least a part of each portion in the management system 200 may be realized by a personal computer or a mobile terminal. Examples of the mobile terminal include a mobile phone, a smartphone, a PDA, a tablet, a notebook computer, a laptop computer, a wearable computer, or the like. The management system 200 may store information by utilizing a distributed ledger technology or a distributed network such as a block chain.

If at least a part of components constituting the management system 200 is realized by a software, the component realized by the software may be realized by activating a program which defines the operation related to the component in an information processing apparatus with a general configuration. The above-described information processing apparatus may include: (i) a data processing apparatus having processors such as a CPU or a GPU, a ROM, a RAM, a communication interface and the like, (ii) an input apparatus such as a keyboard, touch panel, camera, microphone, various types of sensors or GPS receiver, (iii) an output apparatus such as a display apparatus, a speaker or a vibration apparatus, and (iv) a storage apparatus (including an external storage apparatus) such as a memory or a HDD. In the above-described information processing apparatus, the above-described data processing apparatus or storage apparatus may store the above-described program. The above-described program causes the information processing apparatus described above to perform the operations defined by this program, by being executed by the processor. The above-described program may be stored in a non-transitory computer readable recording medium.

The above-described program may be a program which allows a computer to perform one or more procedures related to various types of information processing in the management system 200. The above-described program may be a program which allows a computer to serve as the control apparatus to control the lawn mower 210.

One or more procedures regarding various types of information processing in the management system 200 may be a procedure to control the lawn mower 210. A procedure to control the lawn mower 210 includes, for example, an illuminance information obtaining step to obtain the illuminance information indicating at least one of the (i) the illuminance of the lawn mower 210 in motion and (ii) the illuminance of the region located on the advancing direction of the lawn mower 210 in motion. A procedure to control the lawn mower 210 may include a controlling step to control at least one of an advancing direction, an advancing speed, a travel mode, and a work mode of the lawn mower 210 based on the illuminance information obtained in the illuminance information obtaining step. The above-described computer may be a computer mounted on at least one of the user terminal 22, the lawn mower 210, the image-capturing apparatus 220, the management server 230, and the watering apparatus 240.

[Outline of the Lawn Mower 210]

Figure 3:
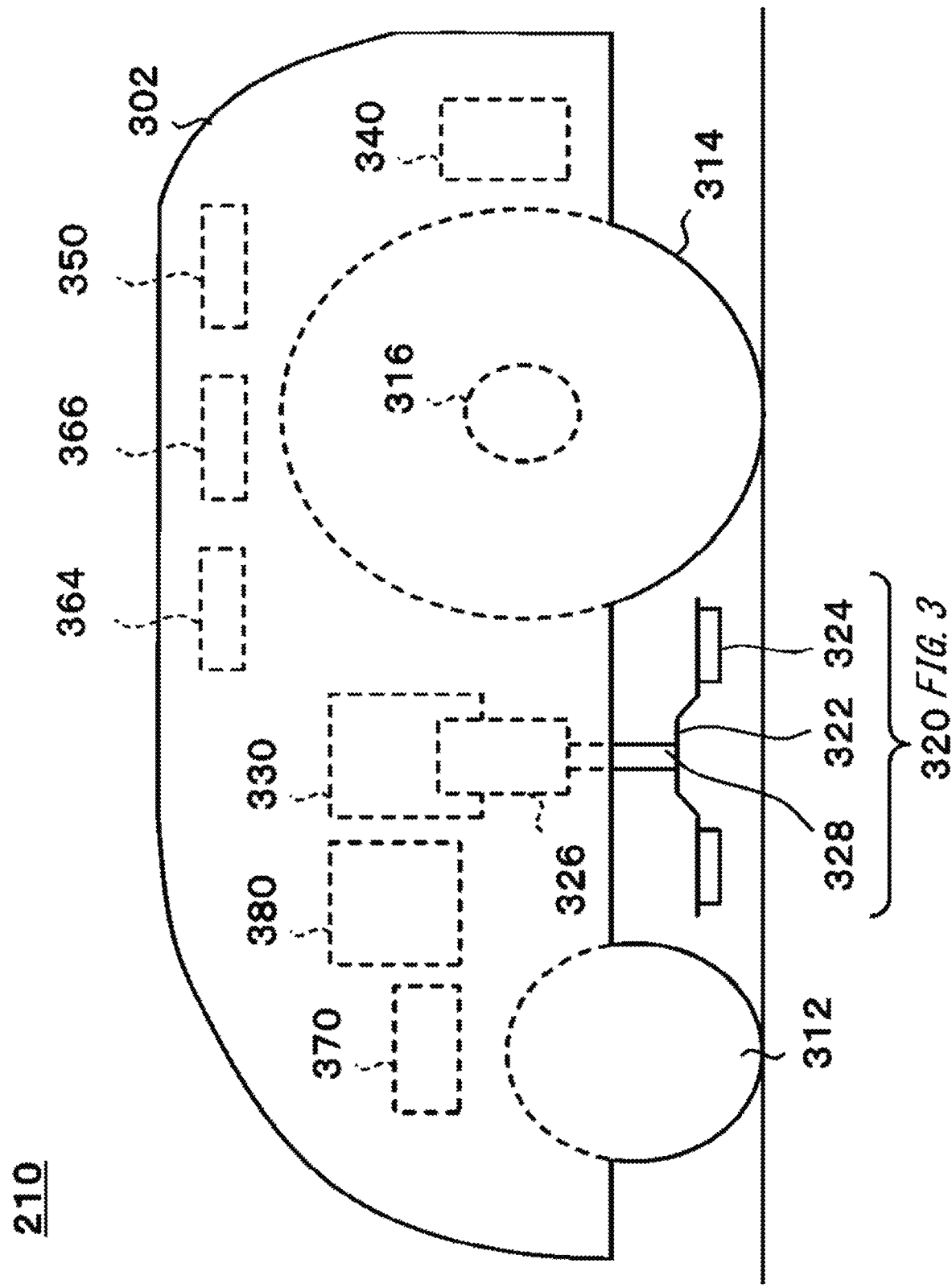
FIG. 3 schematically shows one example of the internal configuration of a lawn mower 210.

The outline of the lawn mower 210 will be described using FIG. 3 to FIG. 9. FIG. 3 schematically shows one example of the internal configuration of the lawn mower 210. In the present embodiment, the lawn mower 210 includes the housing 302. In the present embodiment, the lawn mower 210 includes pair of the front wheel 312 and a pair of the back wheels 314 under the housing 302. The lawn mower 210 may include a pair of the travel motor 316 which respectively drive of a pair of the back wheels 314. The travel motor 316 may be one example of the drive section which drives a moving object.

In the present embodiment, the lawn mower 210 includes the work unit 320. The work unit 320 includes, for example, the blade disk 322, the cutter blade 324, the work motor 326, and the shaft 328. The lawn mower 210 may include the position adjustment section 330 which adjusts the location of the work unit 320. The work motor 326 may be one example of the drive section which drives the moving object.

The blade disk 322 is linked to the work motor 326 via the shaft 328. The cutter blade 324 may be a blade to cut the lawn. The cutter blade 324 is attached to the blade disk 322 and rotates with the blade disk 322. The work motor 326 rotates the blade disk 322. The blade disk 322 and the cutter blade 324 may be one example of a cutting member to cut the work target.

In the present embodiment, the lawn mower 210 includes the battery unit 340, the user interface 350, the image-capturing unit 364, the illuminance sensor 366, the sensor unit 370, and the control unit 380 inside the housing 302 or on the housing 302. The image-capturing unit 364 may be one example of the image capturing section. The control unit 380 may be one example of the control section.

In the present embodiment, the battery unit 340 supplies electric power to each portion of the lawn mower 210. In the present embodiment, the user interface 350 accepts a user input. The user interface 350 outputs information to a user. Examples of the user interface 350 include a keyboard, a pointing device, a microphone, a touch panel, a display, a speaker, and the like.

In the present embodiment, the image-capturing unit 364 captures the image of the circumference of the lawn mower 210. The image-capturing unit 364 may capture the image of at least part of the work region 202. The image may be a video image or may be a static image. The image may be a wide angle image, or may be a 180 degree panoramic image or may be a 360 degree panoramic image. The image may be an image captured by a visible light camera, or an image captured by an infrared camera.

The image-capturing unit 364 may transmit the data of the captured image to the management server 230. The image-capturing unit 364 may transmit the information indicating at least one of the image-capturing direction and the image-capturing condition to the management server 230. The detail of the image-capturing condition may be the same as the above-described detail. The image-capturing unit 364 may perform various types of processing based on the control signal from the control unit 380. Examples of the above-described process include starting an image-capturing, stopping an image-capturing, adjusting or changing an image-capturing direction, adjusting or changing an image-capturing condition, saving an image data, transmitting an image data, and the like.

The image-capturing unit 364 may include equipment to measure the weather condition around the lawn mower 210. Examples of the weather condition include a temperature, humidity, a wind speed, a wind direction, and the like. The image-capturing unit 364 may transmit the information indicating the weather condition around the image-capturing unit 364 to the management server 230.

The illuminance sensor 366 measures the illuminance on the top surface of the lawn mower 210. The illuminance sensor 366 measures the amount of solar radiation on the top surface of the lawn mower 210. The illuminance sensor 366 may transmit the output data to the management server 230.

In the present embodiment, the sensor unit 370 includes various types of sensors. The sensor unit 370 may include various types of internal sensors. The sensor unit 370 may include various types of external sensors. Examples of sensors include a millimeter wave sensor, a proximity detection sensor, an acceleration sensor, an angular velocity sensor, a wheel speed sensor, a load sensor, an idling detection sensor, a magnetic sensor, a geomagnetic sensor (also referred to as orientation sensor, electronic compass, and the like in some cases), a soil moisture sensor, and the like. The sensor unit 370 may transmit the output from various types of sensors to the control unit 380. The wheel speed sensor may be a rotary encoder to detect the angle of rotation or the number of rotations of the wheel.

In the present embodiment, the control unit 380 controls the operation of the lawn mower 210. According to one embodiment, the control unit 380 controls a pair of the travel motor 316 to control the movement of the lawn mower 210. According to another embodiment, the control unit 380 controls the work motor 326 to control the work of the lawn mower 210.

The control unit 380 may control the lawn mower 210 based on the instruction from the management server 230. It may control the lawn mower 210 based on the information indicating the work schedule generated by the management server 230. The control unit 380 may control the lawn mower 210 according to the instruction generated by the management server 230. The control unit 380 will be described in detail later.

Figure 4:
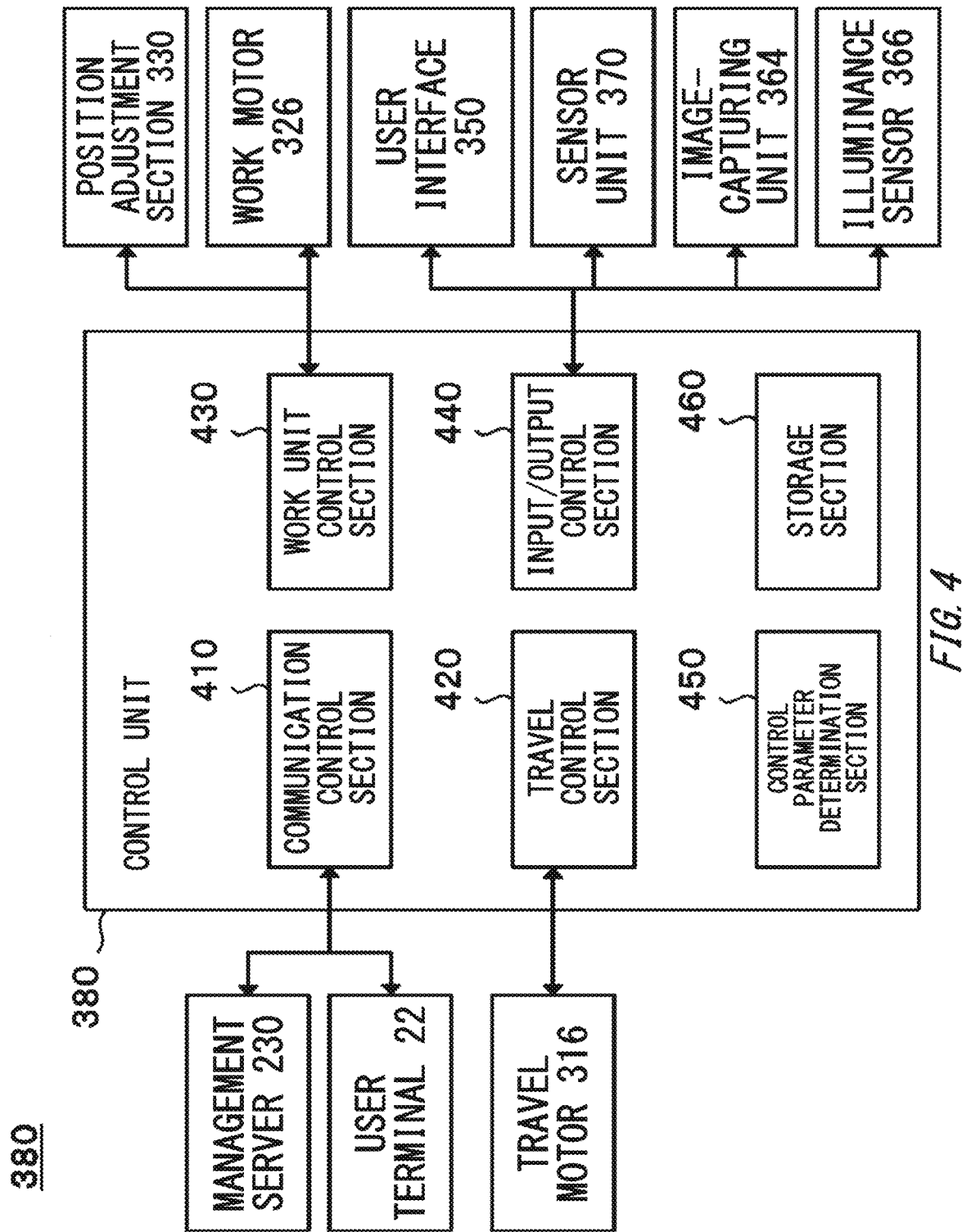
FIG. 4 schematically shows one example of the internal configuration of the control unit 380.

FIG. 4 schematically shows one example of an internal configuration of the control unit 380. In the present embodiment, the control unit 380 includes the communication control section 410, the travel control section 420, the work unit control section 430, and the input/output control section 440. The work unit control section 430 may be one example of the load information obtaining section.

In the present embodiment, the control unit 380 includes the control parameter determination section 450. The control unit 380 may include the storage section 460. The control unit 380 may be one example of the control apparatus. The control parameter determination section may be one example of the control apparatus. The control parameter determination section 450 may have a configuration similar to that of the control apparatus 180 described with reference to FIG. 1 as long as there is no technical contradiction. Likewise, the control apparatus 180 may have a configuration similar to that of the control parameter determination section 450 as long as there is no technical contradiction.

In the present embodiment, the communication control section 410 controls communication with the equipment located outside the lawn mower 210. The communication control section 410 may be a communication interface compatible with one or more communication scheme. Examples of the outside equipment include the user terminal 22, the image-capturing apparatus 220, the management server 230, the watering apparatus 240, and the like.

In the present embodiment, the travel control section 420 controls the travel motor 316 to control movement of the lawn mower 210. The travel control section 420 controls the autonomous travel of the lawn mower 210. For example, the travel control section 420 controls at least one of a movement mode, an advancing speed, an advancing direction, and a moving route of the lawn mower 210. The travel control section 420 may monitor the current value of the travel motor 316.

In the present embodiment, the work unit control section 430 controls the work unit 320. The work unit control section 430 may control at least one of a work mode, a type of work, a work intensity, and a timing of the work being performed of the work unit 320. For example, the work unit control section 430 controls the work motor 326 and controls work intensity of the work unit 320. The work unit control section 430 may control the position adjustment section 330 to control work intensity of the work unit 320.

The work unit control section 430 may obtain the information (which is also referred to as load information in some cases) indicating the load of the work unit 320 which is working. For example, the work unit control section 430 monitors the current value of the work motor 326. The work unit control section 430 may transmit the obtained load information to the control parameter determination section 450. The work unit control section 430 may store the obtained load information into the storage section 460.

In the present embodiment, the input/output control section 440 accepts the input from at least one of the user interface 350, the image-capturing unit 364, the illuminance sensor 366, and the sensor unit 370. The input/output control section 440 outputs information to the user interface 350. The input/output control section 440 may control at least one of the user interface 350, the image-capturing unit 364, the illuminance sensor 366, and the sensor unit 370.

In the present embodiment, the control parameter determination section 450 determines a parameter (also referred to as control parameter in some cases) to control at least one of the travel control section 420 and the work unit control section 430. For example, the control parameter determination section 450 (a) receives the input of the illuminance information indicating at least one of the (i) the illuminance of the lawn mower 210 in motion and (ii) the illuminance of the region located in the advancing direction of the lawn mower 210 in motion and (b) outputs the control parameter. The control parameter determination section 450 may generate the control parameter to control at least one of an advancing direction, an advancing speed, a work mode, and a travel mode of the lawn mower 210 based on the input illuminance information.

The control parameter determination section 450 may determine whether to change the control parameter. For example, the control parameter determination section 450 (a) receives the input of the illuminance information indicating the (i) the illuminance of the lawn mower 210 in motion and (ii) the illuminance of the region located in the advancing direction of the lawn mower 210 in motion and (b) outputs the information indicating whether to change the control parameter. The control parameter determination section 450 will be described in detail later.

In the present embodiment, the storage section 460 stores various types of information. The storage section 460 may store various types of information which is utilized by the control parameter determination section 450 to generate the control parameter. For example, the storage section 460 stores the information indicating the geographic distribution (also referred to as illuminance map in some cases) of the illuminance or the illuminance parameter inside the work region 202. The illuminance map may be the information which associates, for each of a plurality of points inside the work region 202, the information indicating the location of the point and the information indicating the illuminance of the point (for example, illuminance parameter). The illuminance map may be the information which associates, for each of a plurality of regions inside the work region 202, the information indicating the location and the range of the region and the information indicating the illuminance in the region.

The storage section 460 may associate and store the information indicating the illuminance of any region inside of the work region 202 and the information to determine any control parameter in the region. For example, the storage section 460 stores a map or a table which associates the information indicating the illuminance of a particular point or region and the information to determine whether the particular control parameter needs to be changed. The storage section 460 receives the input of the information indicating the illuminance of a particular point or region and may accommodate a learning device to output the information used to determine whether the particular control parameter needs to be changed. The information used to determine whether the particular control parameter needs to be changed may be the information indicating the probability that a particular control parameter is changed.

In one embodiment, the storage section 460 stores the information indicating the geographic distribution (also referred to as probability map in some cases) of the probability that a control parameter inside the work region 202 is changed. The probability map may be the information in which associates, for each of a plurality of regions inside the work region 202, the information indicating the location and range of the region and the information indicating the probability that the lawn mower 210 is permitted to enter the region. In another embodiment, the storage section 460 may store a table (also referred to as translation table in some cases) which associates the information indicating the illuminance of any regions inside the work region 202 and the information indicating the probability that the lawn mower 210 is permitted to enter the region.

Figure 5:
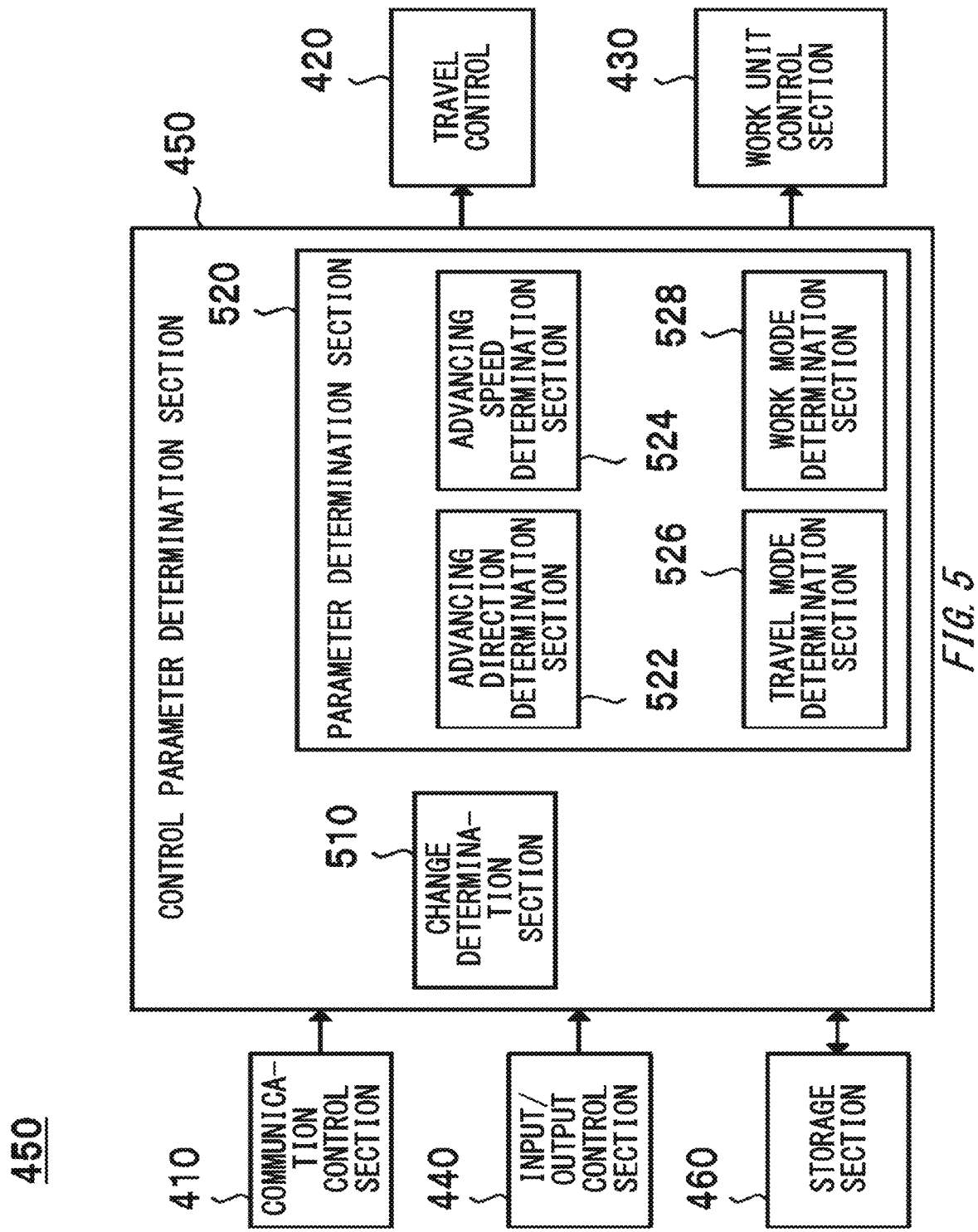
FIG. 5 schematically shows one example of the internal configuration of the control parameter determination section 450.

FIG. 5 schematically shows one example of the internal configuration of the control parameter determination section 450. In the present embodiment, the control parameter determination section 450 includes the change determination section 510 and the parameter determination section 520. In the present embodiment, the parameter determination section 520 has the advancing direction determination section 522, the advancing speed determination section 524, the travel mode determination section 526, and the work mode determination section 528.

The change determination section 510 may be one example of the illuminance information obtaining section. The change determination section 510 may be one example of the change determination section. The parameter determination section 520 may be one example of the control section. The advancing direction determination section 522 may be one example of the instruction output section.

In the present embodiment, the change determination section 510 determines whether the control parameter needs to be changed. The change determination section 510 may determine the control parameter which should be changed among various types of control parameter.

The change determination section 510 may determine whether the control parameter needs to be changed, and the like, in a case in which the boundary of the work region 202 is detected. Examples of the boundary of the work region 202 include (i) a boundary to distinguish the inside and the outside of the work region 202, (ii) a boundary to distinguish contours of equipment, a facility, an obstacle located inside the work region 202, and the like.

The change determination section 510 may determine whether the control parameter needs to be changed based on the illuminance in the vicinity of the lawn mower 210 which is traveling, and the like. In one embodiment, the change determination section 510 (i) obtains the information indicating at least one of the illuminance of the lawn mower 210 in motion and the illuminance of the region located in the advancing direction of the lawn mower 210 in motion and (ii) determines whether the control parameter needs to be changed, and the like, based on the information indicating the above-described illuminance. In another embodiment, the change determination section 510 (i) obtains the information indicating the location of the lawn mower 210 in motion, (ii) obtains the information indicating the illuminance in the location with reference to the illuminance map stored in, for example, the storage section 460, and (iii) determines whether the control parameter needs to be changed, and the like, based on the information indicating the above-described illuminance.

In the present embodiment, the change determination section 510 obtains the data which is output from the image-capturing unit 364 via the input/output control section 440. Thereby, the change determination section 510 can obtain the information indicating the illuminance of the region located on the advancing direction of the lawn mower 210 in motion. The change determination section 510 may obtain the data which is output from the illuminance sensor 366 via the input/output control section 440. Thereby, the change determination section 510 can obtain the information indicating the illuminance of the lawn mower 210 in motion. The change determination section 510 may obtain the data which is output from the image-capturing apparatus 220 via the communication control section 410. Thereby, the change determination section 510 can obtain the information indicating at least one of the illuminance of the lawn mower 210 in motion and the illuminance of the region located on the advancing direction of the lawn mower 210 in motion.

The change determination section 510 may determine whether the control parameter should be changed in a case when at least one of the (i) the illuminance of the lawn mower 210 and (ii) the illuminance of the region located on the advancing direction of the lawn mower 210, which are indicated by the obtained illuminance information, satisfy a predetermined condition. For example, the change determination section 510 determines whether the lawn mower 210 changes the advancing direction in a case when at least one of (i) the illuminance of the lawn mower 210 and (ii) the illuminance of the region located on the advancing direction of the lawn mower 210, which are indicated by the obtained illuminance information, satisfy a predetermined condition. Thereby, the change determination section 510 can determine whether the lawn mower 210 should enter a particular region inside the work region 202. The change determination section 510 will be described in detail later.

In the present embodiment, the parameter determination section 520 determines a content of various types of control parameters. For example, if the change determination section 510 determines that the control parameter needs to be changed, the parameter determination section 520 determine the content of the control parameter. The parameter determination section 520 determines the content of the control parameter which is determined by the change determination section 510 as a control parameter to be changed among various types of the control parameters.

In the present embodiment, the advancing direction determination section 522 determines the control parameter to control the advancing direction of the lawn mower 210. For example, if the change determination section 510 determines that the advancing direction of the lawn mower 210 should be changed, the advancing direction determination section 522 determines the above-described control parameter.

For example, the advancing direction determination section 522 randomly determines the advancing direction after the change. The advancing direction determination section 522 may determine the advancing direction after the change based on at least one of (i) the illuminance of the lawn mower 210, and (ii) the illuminance of the region located on the advancing direction of the lawn mower 210. For example, if the above-described illuminance falls within a predetermined numerical range, the advancing direction determination section 522 determines the advancing direction after the change such that the angle between the advancing direction before the change and the advancing direction after the change satisfies a predetermined condition. For the above-described numerical range, only upper limit may be determined, only lower limit may be determined, or both the upper limit and the lower limit may be determined.

More specifically, the advancing direction determination section 522 may utilize a probability model to determine the angle between the advancing direction before the change and the advancing direction after the change. The angle between the advancing direction before the change and the advancing direction after the change means, in a case when a starting point of a plane vector indicating an advancing direction after the change and a starting point of a plane vector indicating an advancing direction before the change are overlapped, an angle equal to or less than 180 degrees among two angles which are formed by the above-described two vectors.

It is noted that, in the present embodiment, the detail of the advancing direction determination section 522 will be described by using, as an example, a case in which an advancing direction after the change is determined by determining the angle between the advancing direction before the change and the advancing direction after the change. However, the method for the advancing direction determination section 522 to determine the advancing direction after the change is not limited to the present embodiment. In another embodiment, the advancing direction determination section 522 (i) may determine the advancing direction after the change by determining the rotation amount (for example, the angle of rotation) of the lawn mower 210 in the turn location and (ii) may determine the advancing direction after the change by determining the orientation or direction indicating the advancing direction after the change.

In one embodiment, the advancing direction determination section 522 randomly determines the advancing direction after the change. Thereby, if the change determination section 510 determines that the advancing direction of the lawn mower 210 should be changed, the advancing direction of the lawn mower 210 is randomly changed. As a result, a frequency with which the lawn mower 210 enters a particular region is adjusted.

In another embodiment, the advancing direction determination section 522 may determine the advancing direction after the change such that the angle between the advancing direction before the change and the advancing direction after the change falls within a range of a particular numerical range. The advancing direction after the change may be calculated by using any probability model. For example, the advancing direction after the change is randomly determined within a range of the above-described numerical range. The numerical range of the angle between the advancing direction before the change and the advancing direction after the change is determined based on at least one of (i) the illuminance of the lawn mower 210 and (ii) the illuminance of the region located on the advancing direction of the lawn mower 210. The numerical range of the angle between the advancing direction before the change and the advancing direction after the change in a particular point may be determined based on the sunshine condition at the point.

The above-described numerical range may be determined such that the minimum value of the numerical range decreases as the illuminance increases or the sunshine condition becomes better. The above-described numerical range may be determined such that the maximum value of the numerical range decreases as the illuminance increases or the sunshine condition becomes better. The above-described numerical range may be determined such that the numerical range becomes wider as the illuminance increases or the sunshine condition becomes better.

In one embodiment, the advancing direction determination section 522 set the above-described numerical range such that the angle between the advancing direction before the change and the advancing direction after the change is 90 degrees or more, preferably exceeds 90 degrees, more preferably is 120 degrees or more, or even more preferably exceeds 120 degrees. Then, the advancing direction determination section 522 determines the advancing direction after the change within the range of the above-described numerical range. Thereby, lawn mower 210 is prevented from entering the region ahead in the advancing direction.

For example, the advancing direction determination section 522 determines the advancing direction after the change according to the above-described procedure in a case when at least one of the (i) illuminance of the lawn mower 210 and (ii) the illuminance of the region located on the advancing direction of the lawn mower 210 is lower than a predetermined value. The advancing direction determination section 522 may determine the advancing direction after the change according to the above-described procedure in a case when the illuminance of the region located on the advancing direction of the lawn mower 210 is lower than the illuminance of the lawn mower 210.

In another embodiment, the advancing direction determination section 522 sets the above-described numerical range such that the angle between the advancing direction before the change and the advancing direction after the change is equal to or less than 90 degrees, preferably is less than 90 degrees, more preferably equal to or less than 60 degrees, or even more preferably is less than 60 degrees. Then, the advancing direction determination section 522 determines the advancing direction after the change within a range of the above-described numerical range. Thereby, the lawn mower 210 is facilitated to enter the region ahead in the advancing direction.

For example, the advancing direction determination section 522 determines the advancing direction after the change according to the above-described procedure in a case when at least one of the (i) illuminance of the lawn mower 210 and (ii) the illuminance of the region located on the advancing direction of the lawn mower 210 is higher than a predetermined value. The advancing direction determination section 522 may determine the advancing direction after the change according to the above-described procedure if the illuminance of the region located on the advancing direction of the lawn mower 210 is higher than the illuminance of the lawn mower 210.

The advancing direction determination section 522 may output the control parameter indicating the advancing direction after the change. The control parameter output from the advancing direction determination section 522 is transmitted to, for example, the travel control section 420. Thereby, the advancing direction determination section 522 can control the advancing direction of the lawn mower 210. The above-described control parameter may be one example of an instruction to change the advancing direction of the lawn mower 210.

In the present embodiment, the advancing speed determination section 524 determines the control parameter to control the advancing speed of the lawn mower 210. For example, the advancing speed determination section 524 determines the above-described control parameter if the change determination section 510 determines that the advancing direction of the lawn mower 210 should be changed. The advancing speed determination section 524 may output the control parameter indicating the advancing speed after the change. The control parameter output from the advancing speed determination section 524 is transmitted to, for example, the travel control section 420. Thereby, the advancing direction determination section 522 can control the advancing speed of the lawn mower 210.

The advancing speed determination section 524 may determine the advancing speed after the change based on at least one of (i) the illuminance of the lawn mower 210 and (ii) the illuminance of the region located on the advancing direction of the lawn mower 210. For example, the advancing speed determination section 524 determines the advancing speed after the change such that the advancing speed after the change becomes a speed depending on at least one of (i) the illuminance of the lawn mower 210 and (ii) the illuminance of the region located on the advancing direction of the lawn mower 210.

In one embodiment, the advancing speed determination section 524 determines the advancing speed after the change such that the advancing speed becomes lower as the illuminance increases or the sunshine condition becomes better. Thereby, in a region where the growing rate of the lawn 12 is higher, the lawn mowing work is performed more carefully. In another embodiment, the advancing speed determination section 524 determines the advancing speed after the change such that the advancing speed becomes higher as the illuminance becomes higher or the sunshine condition becomes better. Thereby, the region where the growing rate of the lawn 12 is higher can be processed in a shorter time and in a larger-scale. In these cases, the illuminance or the sunshine condition may be continuously proportional, or may be stepwisely proportional to the advancing speed of the lawn mower 210.

The advancing speed determination section 524 may determine the advancing speed after the change such that the advancing speed after the change is higher than the advancing speed before the change such that the illuminance of the region located on the advancing direction of the lawn mower 210 is lower than the illuminance of the lawn mower 210. Likewise, the advancing speed determination section 524 may determine the advancing speed after the change such that the advancing speed after the change is lower than the advancing speed before the change if the illuminance of the region located on the advancing direction of the lawn mower 210 is higher than the illuminance of the lawn mower 210. Thereby, in a region where the growing rate of the lawn 12 is higher, the lawn mowing work is performed more carefully.

If the ratio (A/B) of (A) the illuminance of the region located on the advancing direction of the lawn mower 210 to (B) the illuminance of the lawn mower 210 is lower than a predetermined value, the advancing speed determination section 524 may determine the advancing speed after the change such that the advancing speed after the change is higher than the advancing speed before the change. Likewise, if the ratio (A/B) of (A) the illuminance of the region located on the advancing direction of the lawn mower 210 to (B) the illuminance of the lawn mower 210 is higher than a predetermined value, the advancing speed determination section 524 may determine the advancing speed after the change such that the advancing speed after the change is lower than the advancing speed before the change. Thereby, in a region where the growing rate of the lawn 12 is higher, the lawn mowing work is performed more carefully.

The advancing speed determination section 524 may determine the advancing speed after the change such that the advancing speed after the change is higher than the advancing speed before the change such that the illuminance of the region located on the advancing direction of the lawn mower 210 is higher than the illuminance of the lawn mower 210. Thereby, the region where the growing rate of the lawn 12 is higher can be processed in a shorter time and in a larger-scale. Likewise, the advancing speed determination section 524 may determine the advancing speed after the change such that the advancing speed after the change is lower than the advancing speed before the change if the illuminance of the region located on the advancing direction of the lawn mower 210 is lower than the illuminance of the lawn mower 210.

If the ratio (A/B) of (A) the illuminance of the region located on the advancing direction of the lawn mower 210 to (B) the illuminance of the lawn mower 210 is higher than a predetermined value, the advancing speed determination section 524 may determine the advancing speed after the change such that the advancing speed after the change is higher than the advancing speed before the change. Thereby, the region where the growing rate of the lawn 12 is higher can be processed in a shorter time and in a larger-scale. Likewise, if the ratio (A/B) of (A) the illuminance of the region located on the advancing direction of the lawn mower 210 to (B) the illuminance of the lawn mower 210 is lower than a predetermined value, the advancing speed determination section 524 may determine the advancing speed after the change such that the advancing speed after the change is lower than the advancing speed before the change.

If it is expected that a variation of the illuminance satisfies a predetermined condition or a variation of the illuminance satisfies a predetermined condition, the advancing speed determination section 524 determines to reduce the advancing speed of the lawn mower 210 or stop the lawn mower 210 for a while. Examples of a predetermined condition include (a) a condition that the variation of at least one of (i) the illuminance of the lawn mower 210 and (ii) the illuminance of the region located on the advancing direction of the lawn mower 210 exceed a predetermined range, (b) a condition that a ratio (A/B) of (A) the illuminance of the region located on the advancing direction of the lawn mower 210 to (B) the illuminance of the lawn mower 210 exceeds a predetermined range, and the like. The above-described range may be represented as a numerical range or may be represented with a stepwise evaluation segmentation.

Thereby, for example, the image-capturing unit 364 or the illuminance sensor 366 can adjust settings of each unit while the advancing of the lawn mower 210 is restricted. For example, the image-capturing unit 364 can adjust the exposure. Subsequently, the advancing speed determination section 524 may determine the advancing speed after the change such that the advancing speed after the change becomes a advancing speed depending on at least one of (i) the illuminance of the lawn mower 210 and (ii) the illuminance of the region located on the advancing direction of the lawn mower 210.

In the present embodiment, the travel mode determination section 526 determines the control parameter to control the travel mode of the lawn mower 210. For example, if the travel mode determination section 526 determines that the travel mode of the lawn mower 210 should be changed, the change determination section 510 determines the above-described control parameter. The travel mode determination section 526 may output the control parameter indicating the travel mode after the change. The control parameter output from the travel mode determination section 526 is transmitted to, for example, the travel control section 420. Thereby, the advancing direction determination section 522 can control the travel mode of the lawn mower 210.

The travel mode determination section 526 may determine the travel mode after the change based on at least one of (i) the illuminance of the lawn mower 210, and (ii) the illuminance of the region located on the advancing direction of the lawn mower 210. For example, the travel mode determination section 526 determines the travel mode after the change such that the travel mode after the change becomes the travel mode depending on at least one of (i) the illuminance of the lawn mower 210 and (ii) the illuminance of the region located on the advancing direction of the lawn mower 210.

In the present embodiment, the work mode determination section 528 determines a control parameter to control the work mode of the lawn mower 210. For example, if the change determination section 510 determines that the work mode of the lawn mower 210 should be changed, the work mode determination section 528 determines the above-described control parameter. The work mode determination section 528 may output the control parameter indicating the work mode after the change. The control parameter output from the work mode determination section 528 is transmitted to, for example, the work unit control section 430. Thereby, the advancing direction determination section 522 can control the work mode of the lawn mower 210.

The work mode determination section 528 determines the work mode after the change based on at least one of (i) the illuminance of the lawn mower 210 and (ii) the illuminance of the region located on the advancing direction of the lawn mower 210. For example, the work mode determination section 528 determines the work mode after the change such that the work mode after the change becomes the work mode depending on at least one of (i) the illuminance of the lawn mower 210 and (ii) the illuminance of the region located on the advancing direction of the lawn mower 210.

The work mode determination section 528 may determine the work mode after the change such that the work intensity increases as the illuminance becomes larger or the sunshine condition becomes better. The illuminance or the sunshine condition may be continuously proportional or stepwisely proportional to the work intensity of the lawn mower 210. For example, the work mode determination section 528 determines the work mode after the change such that the number of rotations per unit time of the work motor 326 increases as the illuminance becomes higher or the sunshine condition becomes better. Thereby, in the region where the growing rate of the lawn 12 is higher, the lawn mowing work is performed with higher work intensity.

If the illuminance of the region located on the advancing direction of the lawn mower 210 is lower than the illuminance of the lawn mower 210, the work mode determination section 528 determines the work intensity after the change such that the work intensity after the change becomes lower than the work intensity before the change. Likewise, if the illuminance of the region located on the advancing direction of the lawn mower 210 is higher than the illuminance of the lawn mower 210, the work mode determination section 528 may determine the work intensity after the change such that the work intensity after the change is higher than the work intensity before the change. Thereby, in the region where the growing rate of the lawn 12 is higher, the lawn mowing work is performed with higher work intensity.

If the ratio (A/B) of (A) the illuminance of the region located on the advancing direction of the lawn mower 210 to (B) the illuminance of the lawn mower 210 is lower than a predetermined value, the work mode determination section 528 may determine the work intensity after the change such that the work intensity after the change is lower than the work intensity before the change. Likewise, if the ratio (A/B) of (A) the illuminance of the region located on the advancing direction of the lawn mower 210 to (B) the illuminance of the lawn mower 210 is higher than a predetermined value, the work mode determination section 528 may determine the work intensity after the change such that the work intensity after the change is higher than the work intensity before the change. Thereby, in the region where the growing rate of the lawn 12 is higher, the lawn mowing work is performed with higher work intensity.

If it is expected that a variation of the illuminance satisfies a predetermined condition or the variation of the illuminance satisfies a predetermined condition, the work mode determination section 528 may determine to reduce the work intensity or stop the work for a while. Examples of a predetermined condition include (a) a condition that at least one of the variation of (i) the illuminance of the lawn mower 210 and (ii) the illuminance of the region located on the advancing direction of the lawn mower 210 exceed a predetermined range, (b) a condition that a ratio (A/B) of (A) the illuminance of the region located on the advancing direction of the lawn mower 210 to (B) the illuminance of the lawn mower 210 exceeds a predetermined range, and the like. The above-described range may be represented as a numerical range or may be represented with a stepwise evaluation segmentation.

Thereby, for example, the image-capturing unit 364 or the illuminance sensor 366 can adjust settings of each unit while the work of the work unit 320 is restricted. For example, the image-capturing unit 364 can adjust the exposure. Subsequently, the work mode determination section 528 may determine the work intensity after the change such that the work intensity after the change becomes the work intensity depending on at least one of (i) the illuminance of the lawn mower 210 and (ii) the illuminance of the region located on the advancing direction of the lawn mower 210.

Figure 6:
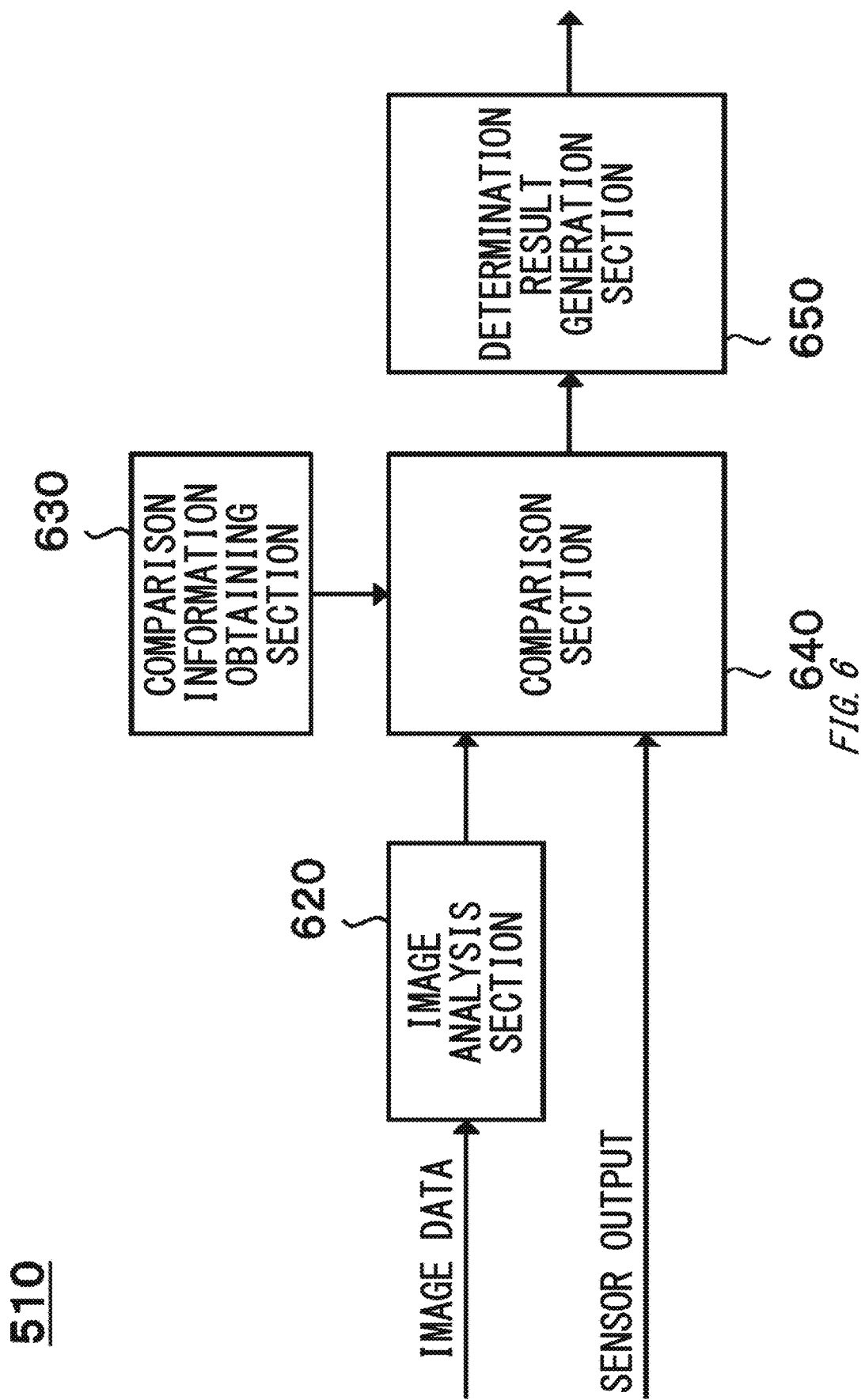
FIG. 6 schematically shows one example of the internal configuration of the change determination section 510.

FIG. 6 schematically shows one example of the internal configuration of the change determination section 510. In the present embodiment, the change determination section 510 includes the image analysis section 620, the comparison information obtaining section 630, the comparison section 640, and the determination result generation section 650. The image analysis section 620 may be one example of the illuminance information obtaining section. The comparison information obtaining section 630 may be one example of the illuminance information obtaining section. The comparison section 640 may be one example of the illuminance information obtaining section. The determination result generation section 650 may be one example of the control section. The determination result generation section 650 may be one example of the change determination section.

In the present embodiment, the image analysis section 620 analyzes image data. For example, the image analysis section 620 obtains the image data of the image captured by the image-capturing apparatus 220 via the communication control section 410. For example, the image analysis section 620 obtains the image data of the image captured by the image-capturing unit 364 via the input/output control section 440. The image analysis section 620 outputs the information indicating the analysis result of the image data and transmits the information to the comparison section 640.

In one embodiment, the image analysis section 620 receives, as an input, the image data of the captured image of the lawn mower 210 which is traveling and outputs the illuminance information indicating the illuminance of the lawn mower 210. In another embodiment, the image analysis section 620 receives, as the input, the image data of the captured image of a region located on the advancing direction of the lawn mower 210 which is traveling, and outputs the illuminance information indicating the illuminance of the region. In yet another embodiment, the image analysis section 620 receives, as the input, the image data of the captured image of the lawn mower 210 which is traveling and the vicinity region and outputs the illuminance information indicating at least one of (i) the illuminance of the lawn mower 210 and (ii) the illuminance of a region located on the advancing direction of the lawn mower 210. The captured image of the lawn mower 210 which is traveling and the vicinity region may be one example of the image captured by the image-capturing apparatus 220.

In the present embodiment, the comparison information obtaining section 630 obtains the information used as a reference value of the illuminance (also referred to as comparison information in some cases) in the comparison section 640. For example, the comparison information obtaining section 630 obtains the information input to the user interface 350 via the input/output control section 440. The comparison information obtaining section 630 may obtain the data of the image captured by the image-capturing unit 364 via the input/output control section 440. The comparison information obtaining section 630 may obtain the data output from the illuminance sensor 366 via the input/output control section 440. The comparison information obtaining section 630 may obtain the data of the image captured by the image-capturing apparatus 220 via the communication control section 410.

In one embodiment, the comparison information obtaining section 630 obtains the information indicating the illuminance at a point used as a reference (also referred to as reference point in some cases) as comparison information. The reference point may be a point located inside or in the vicinity of the work region 202. Examples of the information indicating the illuminance of a reference point include the output from an illuminance sensor placed on a reference point, an analysis result of an image data of the captured image of a reference point, and the like. The output of the illuminance sensor placed on a reference point may be (i) the data output from a fixed illuminance sensor placed on a reference point or (ii) the data output from the illuminance sensor 366 when the lawn mower 210 passed the reference point.

For example, if the work region 202 is in outdoors, the illuminance in each location inside the work region 202 is affected by the time and the weather condition. According to the present embodiment, the comparison information obtaining section 630 can output the comparison information which is less affected by the time and the weather condition.

In another embodiment, the comparison information obtaining section 630 obtains, as comparison information, the information indicating the illuminance of one or more points located on the trajectory of the lawn mower 210. The comparison information obtaining section 630 may obtain, as comparison information, the information indicating the illuminance measured during a particular period among the illuminance of one or more points located on the trajectory of the lawn mower 210.

The particular period may be the last predetermined period or may be a period from any first time to any second time. The last predetermined period may be the last 30 seconds, may be the last one minute, may be the last five minutes, may be the last 10 minutes, may be the last 15 minutes, or may be the last 30 minutes.

The illuminance of one or more points located on the trajectory of the lawn mower 210 may be determined based on at least one of the image data of the image captured by the image-capturing apparatus 220, the image data of the image captured by the image-capturing unit 364, and the data output from the illuminance sensor 366. The comparison information obtaining section 630 may obtain, as comparison information, the information indicating the statistical value of the illuminance at a plurality of points located on the trajectory of the lawn mower 210. Examples of the statistical value include an average value, a median value, a mode value, and the like.

For example, if the work region 202 is in outdoors, the illuminance in each location inside the work region 202 is affected by the time and the weather condition. According to the present embodiment, the comparison information obtaining section 630 can output the comparison information which is less affected by the time and the weather condition.

In yet another embodiment, the comparison information obtaining section 630 may obtain, as comparison information, the illuminance information indicating the illuminance of the lawn mower 210. Thereby, the comparison section 640 can compare the illuminance of a region located ahead in the advancing direction of the lawn mower 210 and the illuminance of the lawn mower 210. The illuminance of the lawn mower 210 may be determined based on at least one of the image data of the image captured by the image-capturing apparatus 220, the image data of the image captured by the image-capturing unit 364, and the data output from the illuminance sensor 366.

For example, if the work region 202 is in outdoors, the illuminance in each location inside the work region 202 is affected by the time and the weather condition. According to the present embodiment, the comparison information obtaining section 630 can output the comparison information which is less affected by the time and the weather condition.

In yet another embodiment, the comparison information obtaining section 630 may obtain, as comparison information, the threshold calculated by a predetermined algorithm. According to the above-described algorithm, for example, a threshold in a particular time is calculated based on the information indicating the reference value of a threshold related to the illuminance, and at least one of the information indicating the time and the information indicating the weather condition. The information indicating the time may include the information indicating a date. For example, the comparison information obtaining section 630 may obtain at least one of the information indicating the time and the information indicating the weather condition from the management server 230 or another server via the communication control section 410.

For example, if the work region 202 is in outdoors, the illuminance in each location inside the work region 202 is affected by the time and the weather condition. According to the present embodiment, the comparison information obtaining section 630 can output the comparison information in which the time or weather condition is considered.

In yet another embodiment, the comparison information obtaining section 630 obtains, as comparison information, the information indicating a predetermined threshold. For example, the comparison information obtaining section 630 obtains the information indicating the predetermined threshold via the user interface 350.

In the present embodiment, the comparison section 640 can obtain the information indicating the analysis result of the image analysis section 620 from the image analysis section 620. The comparison section 640 may obtain the data output from the illuminance sensor 366 via the input/output control section 440. Thereby, the comparison section 640 obtains the information indicating at least one of (i) the illuminance of the lawn mower 210 which is traveling and (ii) the illuminance of the region located on the advancing direction of the lawn mower 210 which is traveling.

In the present embodiment, the comparison section 640 outputs the information indicating whether at least one of (i) the illuminance of the lawn mower 210 which is traveling and (ii) the illuminance of the region located on the advancing direction of the lawn mower 210 which is traveling satisfy the predetermined condition. For example, the comparison section 640 outputs the information indicating whether (a) at least one of (i) the illuminance of the lawn mower 210 which is traveling and (ii) the illuminance of the region located on the advancing direction of the lawn mower 210 which is traveling is higher than (b) the illuminance indicated by at least one of one or more pieces of comparison information obtained by the comparison information obtaining section 630.

More specifically, the comparison section 640 obtains one or more pieces of comparison information obtained by the comparison information obtaining section 630 from the comparison information obtaining section 630. The comparison section 640 compares (a) at least one of (i) the illuminance of the lawn mower 210 which is traveling and (ii) the illuminance of the region located on the advancing direction of the lawn mower 210 which is traveling and (b) the illuminance indicated by at least one of one or more pieces of comparison information obtained by the comparison information obtaining section 630.

In one embodiment, if the information indicating the illuminance of the reference point is used as comparison information, the comparison section 640 compares, for example, (i) the illuminance of the reference point and (ii) the illuminance of the region located on the advancing direction of the lawn mower 210 which is traveling or the illuminance of the lawn mower 210 which is traveling to determine which is higher. In another embodiment, if the information indicating the illuminance of the lawn mower 210 is used as comparison information, the comparison section 640 compares the illuminance of the region located on the advancing direction of the lawn mower 210 which is traveling and the illuminance of the lawn mower 210 which is traveling to determine which is higher. Likewise, the comparison section 640 compares (i) a value to be used as the reference value or threshold of the illuminance and (ii) the illuminance of the region located on the advancing direction of the lawn mower 210 which is traveling or the illuminance of the lawn mower 210 which is traveling to determine which is higher.

In the present embodiment, the information output from the comparison section 640 is transmitted to, for example, the determination result generation section 650. The comparison section 640 may transmit, to the determination result generation section 650, the information indicating at least one of (i) the illuminance of the lawn mower 210 which is traveling and (ii) the illuminance of the region located on the advancing direction of the lawn mower 210 which is traveling.

In the present embodiment, the determination result generation section 650 determines whether at least one of one or more control parameters need to be changed based on the information output from the comparison section 640. For example, the determination result generation section 650 determines whether a control parameter which defines the advancing direction of the lawn mower 210 needs to be changed based on the information output from the comparison section 640. Thereby, the change determination section 510 can determine whether the lawn mower 210 should enter a particular region inside the work region 202.

In one embodiment, if the comparison section 640 outputs the information indicating that at least one of (i) the illuminance of the lawn mower 210 which is traveling and (ii) the illuminance of the region located on the advancing direction of the lawn mower 210 which is traveling satisfy a predetermined condition, the determination result generation section 650 outputs the information indicating that the control parameter which defines the advancing direction of the lawn mower 210 is to be changed as the determination result. The above-described information may be one example of the instruction to change the advancing direction of the lawn mower 210.

In another embodiment, if the comparison section 640 outputs the information indicating that at least one of (i) the illuminance of the lawn mower 210 which is traveling and (ii) the illuminance of the region located on the advancing direction of the lawn mower 210 which is traveling satisfy a predetermined condition, the determination result generation section 650 determines whether to change the advancing direction of the lawn mower 210 based on the predetermined algorithm. Then, if it is determined that the advancing direction of the lawn mower 210 is changed, the determination result generation section 650 outputs the information indicating that the control parameter which defines the advancing direction of the lawn mower 210 is to be changed as the determination result. The above-described information may be one example of an instruction to change the advancing direction of the lawn mower 210.

Examples of a predetermined condition include a condition that the above-described variation of illuminance exceeds a predetermined range, a condition that the variation of the above-described illuminance exceeds the predetermined range, and the like. The above-described range may be represented as a numerical range, or may be represented with stepwise evaluation segmentation.

For example, the determination result generation section 650 determines whether to change the advancing direction of the lawn mower 210 based on the probability model. In one embodiment, the probability model is designed such that the probability that the advancing direction of the lawn mower 210 is changed increases as (i) the illuminance of the lawn mower 210 in motion or (ii) the illuminance of the region located on the advancing direction of the lawn mower 210 in motion becomes lower. In another embodiment, in the probability model, the probability that the advancing direction of the lawn mower 210 is changed is defined based on the sunshine condition at each location inside the work region 202. For example, the above-described probability model may be a probability map stored in the storage section 460, the translation table, or the learning device.

According to the present embodiment, for example, if the illuminance of the current location of the lawn mower 210 which is traveling or the region ahead in the advancing direction of the lawn mower 210 which is traveling is lower than a particular reference value, a probabilistic method can be used to determine whether the lawn mower 210 continues straight moving or whether the lawn mower 210 changes the course. Thereby, the frequency with which the lawn mower 210 enters a region with a better sunshine condition increases and the frequency with which the lawn mower 210 enters a region with a poor sunshine condition decreases. Generally, the growing speed of the lawn 12 is higher in a region with a better sunshine condition, while the growing speed of the lawn 12 is lower in a region with a poor sunshine condition. Therefore, it is desirable to increase a work amount in a region with a better sunshine condition and to decrease a work amount in a region with a poor sunshine condition. According to the present embodiment, the work amount can be appropriately managed with a convenient method.

It is noted that the determination result generation section 650 may determine whether at least one of an advancing speed, a travel mode, and a work mode need to be changed in the manner similar to a method to determine whether the advancing direction needs to be changed. In one embodiment, if the comparison section 640 outputs the information indicating that at least one of (i) the illuminance of the lawn mower 210 which is traveling and (ii) the illuminance of the region located on the advancing direction of the lawn mower 210 which is traveling satisfy a predetermined condition, the determination result generation section 650 outputs, as the determination result, the information indicating that a control parameter which defines at least one of an advancing speed, a travel mode, and a work mode of the lawn mower 210 is to be changed.

In another embodiment, if the comparison section 640 outputs the information indicating that at least one of (i) the illuminance of the lawn mower 210 which is traveling and (ii) the illuminance of the region located on the advancing direction of the lawn mower 210 which is traveling satisfy a predetermined condition, the determination result generation section 650 determines whether to change at least one of an advancing speed, a travel mode, and a work mode of the lawn mower 210 based on the predetermined algorithm. Then, if it is determined that at least one of an advancing speed, a travel mode, and a work mode of the lawn mower 210 is to be changed, the determination result generation section 650 outputs, as the determination result, the information indicating that a control parameter which defines at least one of an advancing speed, a travel mode, and a work mode of the lawn mower 210 are to be changed.

Examples of a predetermined condition include a condition that the above-described variation of illuminance exceeds a predetermined range, a condition that the variation of the above-described illuminance exceeds a predetermined range, and the like. The above-described range may be represented as a numerical range, and may be represented with a stepwise evaluation segmentation.

In the present embodiment, the determination result generation section 650 has been described in detail using a case as an example, in which the determination result generation section 650 determines whether at least one of one or more control parameters need to be changed based on the information output from the comparison section 640. However, the determination result generation section 650 is not limited to the present embodiment. In another embodiment, the determination result generation section 650 may determine whether at least one of one or more control parameters need to be changed based on the information output from the comparison section 640 and another information. It is noted that even in this case, the determination result generation section 650 determines whether at least one of one or more control parameters need to be changed based on the information output from the comparison section 640.

For example, the determination result generation section 650 determines whether at least one of one or more control parameters need to be changed based on the information output from the comparison section 640 and the information indicating the load of the work unit 320. Examples of the load of the work unit 320 include the load of the work motor 326, the current value of the current supplied to the work motor 326, the degree of wear of the cutter blade 324, and the like. Thereby, the control unit 380 can control, for example, at least one of an advancing direction, an advancing speed, a travel mode, and a work mode of the lawn mower 210 based on the illuminance of the lawn mower 210 or the illuminance in the vicinity of the lawn mower 210, and the load of the work unit 320 in the lawn mower 210.

In one embodiment, in a case where the comparison section 640 outputs the information indicating that at least one of (i) the illuminance of the lawn mower 210 which is traveling and (ii) the illuminance of a region located on the advancing direction of the lawn mower 210 which is traveling satisfy a predetermined first condition, when the load of the work unit 320 satisfies a predetermined second condition, the determination result generation section 650 outputs, as the determination result, the information indicating that the control parameter which defines at least one of an advancing direction, an advancing speed, a travel mode, and a work mode of the lawn mower 210 is to be changed. The first condition may be a condition related to the illuminance. The second condition is a condition related to the load and may be a condition different from the first condition.

Specifically, if (a) the illuminance of a particular region is lower than a threshold related to the illuminance and (b) the load of the work unit 320 in the region is lower than the threshold related to the load, the probability that the growing condition of the lawn 12 is poor or the lawn 12 is not growing is relatively high. Therefore, if (a) the illuminance of the current location of the lawn mower 210 which is traveling or the region ahead in the advancing direction of the lawn mower 210 which is traveling is lower than a threshold related to the illuminance and (b) the load of the work unit 320 is lower than the threshold related to the load, the determination result generation section 650 determines whether at least one of the control parameters need to be changed such that the work amount in the region ahead in the advancing direction is reduced. Then, if there is a control parameter to be changed, the information indicating that the control parameter is to be changed is output.

In another embodiment, in a case where the comparison section 640 outputs the information indicating that at least one of (i) the illuminance of the lawn mower 210 which is traveling and (ii) the illuminance of a region located on the advancing direction of the lawn mower 210 which is traveling satisfy a predetermined first condition, when the load of the work unit 320 satisfies a predetermined third condition, the determination result generation section 650 outputs, as the determination result, the information indicating that the control parameter which defines at least one of an advancing direction, an advancing speed, a travel mode, and a work mode of the lawn mower 210 is to be changed. The third condition is a condition related to the load, and may be a condition different from the above-described first condition and second condition. The third condition may be a condition that the above-described second condition is not satisfied.

Specifically, if (a) the illuminance of a particular region is lower than the threshold related to the illuminance and (b) the load of the work unit 320 in the region is higher than the threshold related to the load, the probability that the frequency with which the lawn mower 210 perform the work in the region is low and a relatively long period has elapsed since the work was performed last time is relatively high. Therefore, if (a) the illuminance of the current location of the lawn mower 210 which is traveling or the region ahead in the advancing direction of the lawn mower 210 which is traveling is lower than a threshold related to the illuminance and (b) the load of the work unit 320 is higher than the threshold related to the load, the determination result generation section 650 determines whether at least one of the control parameters need to be changed such that the work amount in the region ahead in the advancing direction is not reduced or the work amount in the region ahead in the advancing direction is increased. Then, if there is a control parameter to be changed, the information indicating that the control parameter is to be changed is output.

In the present embodiment, the control parameter determination section 450 has been described in detail by using an example in which the change determination section 510 determines whether at least one of one or more control parameters need to be changed and the parameter determination section 520 determines the parameter after the change. However, the control parameter determination section 450 is not limited to the present embodiment. In another embodiment, the change determination section 510 may determine whether at least one of one or more control parameters need to be changed and determine the parameter after the change. In yet another embodiment, the parameter determination section 520 may determine whether at least one of one or more control parameters need to be changed and determine the parameter after the change.

Figure 7:
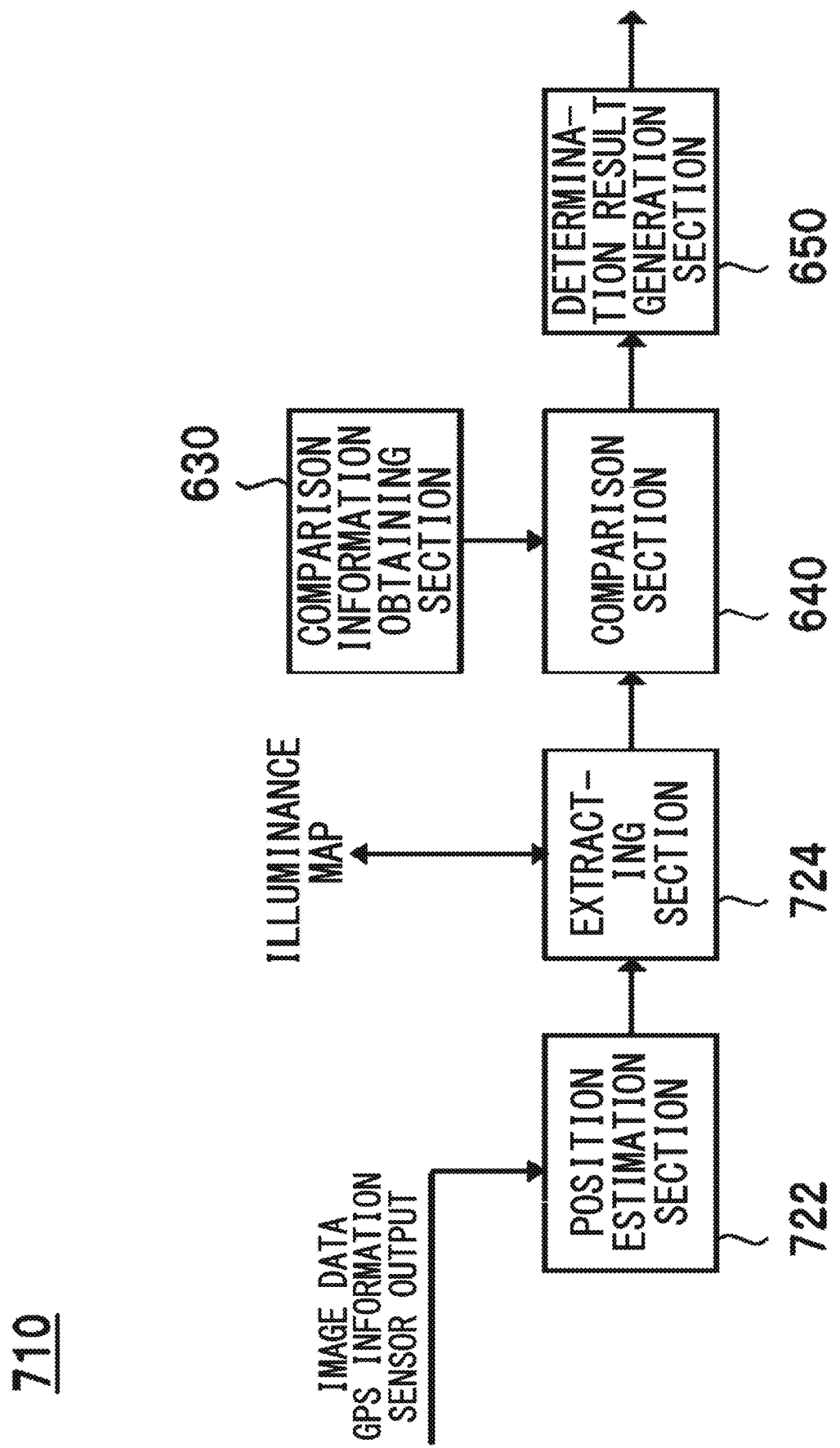
FIG. 7 schematically shows one example of the internal configuration of the change determination section 710.

FIG. 7 schematically shows one example of the internal configuration of the change determination section 710. In the present embodiment, the change determination section 710 includes the position estimation section 722, the extracting section 724, the comparison information obtaining section 630, the comparison section 640, and the determination result generation section 650. The change determination section 710 may be one example of the illuminance information obtaining section. The change determination section 710 may be one example of the change determination section. The extracting section 724 may be one example of the illuminance information obtaining section.

The change determination section 710 may be another example of the change determination section 510. The change determination section 710 is different from the change determination section 510 in that it (i) obtains the information indicating the location of the lawn mower 210 in motion, (ii) obtains the information indicating the illuminance in the location with reference to the illuminance map stored in, for example, the storage section 460, and (iii) determines whether the control parameter needs to be changed, and the like, based on the information indicating the above-described illuminance.

The change determination section 710 may have a configuration similar to the change determination section 510 as long as there is no technical contradiction. Likewise, the change determination section 510 may have a configuration similar to the change determination section 710 as long as there is no technical contradiction. In addition, it has the feature of both the change determination section 510 and the change determination section 710. The change determination section according to another embodiment may be provided.

In the present embodiment, the change determination section 710 determines whether the control parameter needs to be changed. The change determination section 710 may determine the control parameter to be changed among various types of control parameters.

The change determination section 710 may determine whether the control parameter should be changed in a case when at least one of the (i) the illuminance of the lawn mower 210 and (ii) the illuminance of the region located on the advancing direction of the lawn mower 210, which are indicated by the obtained illuminance information, satisfy a predetermined condition. For example, the change determination section 710 determines whether the lawn mower 210 changes the advancing direction in a case when at least one of (i) the illuminance of the lawn mower 210 and (ii) the illuminance of the region located on the advancing direction of the lawn mower 210, which are indicated by the obtained illuminance information, satisfy a predetermined condition. Thereby, the change determination section 710 can determine whether the lawn mower 210 should enter a particular region inside the work region 202.

In the present embodiment, the position estimation section 722 estimates the location of the lawn mower 210. The position estimation section 722 may estimate the location of the lawn mower 210 based on the output from at least one of the internal sensor and the external sensor mounted on the lawn mower 210. The position estimation section 722 may estimate the location of the lawn mower 210 based on the analysis result of the image captured by the image-capturing apparatus 220.

For example, the position estimation section 722 obtains the image data of the image captured by the image-capturing apparatus 220 via the communication control section 410. For example, the position estimation section 722 obtains the image data of the image captured by the image-capturing unit 364 via the input/output control section 440. For example, the position estimation section 722 obtains the data output from the sensor unit 370 via the input/output control section 440. Examples of the data output from the sensor unit 370 include the output data from a GPS signal receiver, the output data from an acceleration sensor, the output data from a gyro sensor, the output data from a wheel encoder, and the like.

The position estimation section 722 utilizes the various types of obtained information to estimate the location of the lawn mower 210 which is traveling. The position estimation section 722 outputs the information indicating the estimated location of the lawn mower 210 and transmits the information to the extracting section 724.

In the present embodiment, the extracting section 724 obtains the information indicating the estimated location of the lawn mower 210 from the position estimation section 722. For example, the extracting section 724 extracts the information indicating the illuminance in the estimated location of the lawn mower 210 with reference to the illuminance map stored in the storage section 460. Thereby, the extracting section 724 can obtain the illuminance information indicating the illuminance of the lawn mower 210 which is traveling. The extracting section 724 may receive, as the input, the information required for the learning device stored in the storage section 460 and obtain the information indicating the illuminance in the estimated location of the lawn mower 210.

In the present embodiment, the comparison information obtaining section 630 and the determination result generation section 650 may respectively have a configuration similar to the comparison information obtaining section 630 and the determination result generation section 650 of the change determination section 510. In the present embodiment, the comparison section 640 is different from the comparison section 640 of the change determination section 510 in that it obtains the illuminance information indicating the illuminance of the lawn mower 210 which is traveling from the extracting section 724. The comparison section 640 of the change determination section 710 may have a configuration similar to the comparison section 640 of the change determination section 510 except the above-described difference. For example, the comparison section 640 outputs the information indicating whether the illuminance of the lawn mower 210 which is traveling satisfies a predetermined condition.

In the present embodiment, a case is described in which the extracting section 724 extracts the information indicating the illuminance in the estimated location of the lawn mower 210 with reference to the illuminance map stored in the storage section 460. However, the extracting section 724 is not limited to the present embodiment. In another embodiment, the extracting section 724 may extract the information indicating the probability that the control parameter is changed in an estimated location of the lawn mower 210 with reference to the probability map stored in the storage section 460. The extracting section 724 may receive, as the input, the information required for the learning device stored in the storage section 460 and obtain the information indicating the probability that the control parameter is changed in the estimated location of the lawn mower 210. In this case, the change determination section 710 may not have the comparison information obtaining section 630 and the comparison section 640. Also, the determination result generation section 650 may generate the information indicating whether to change an advancing direction of the lawn mower 210 based on the information obtained by the extracting section 724.

Figure 8:
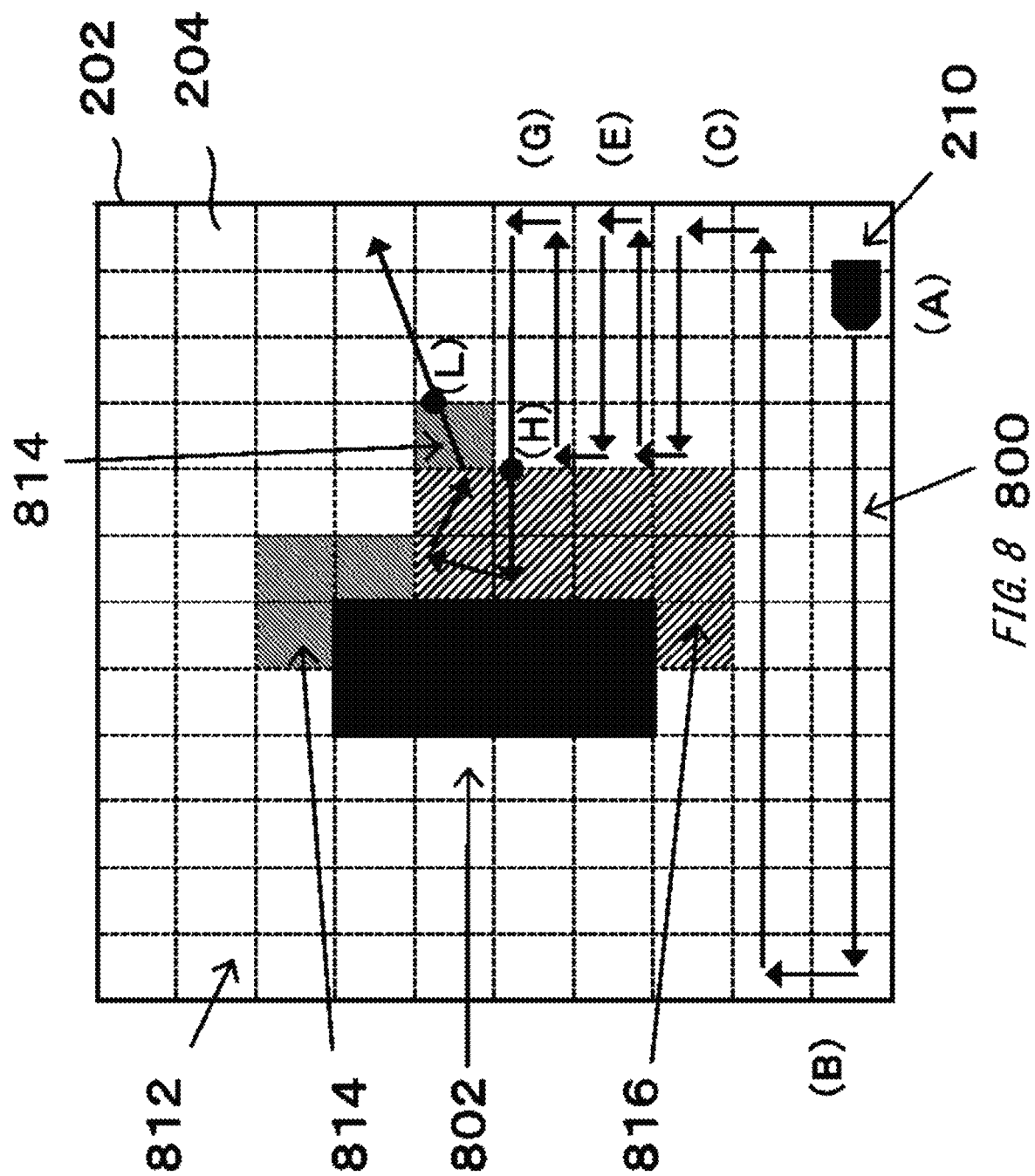
FIG. 8 schematically shows one example of a method to control an operation mode of the lawn mower 210.
Figure 9:
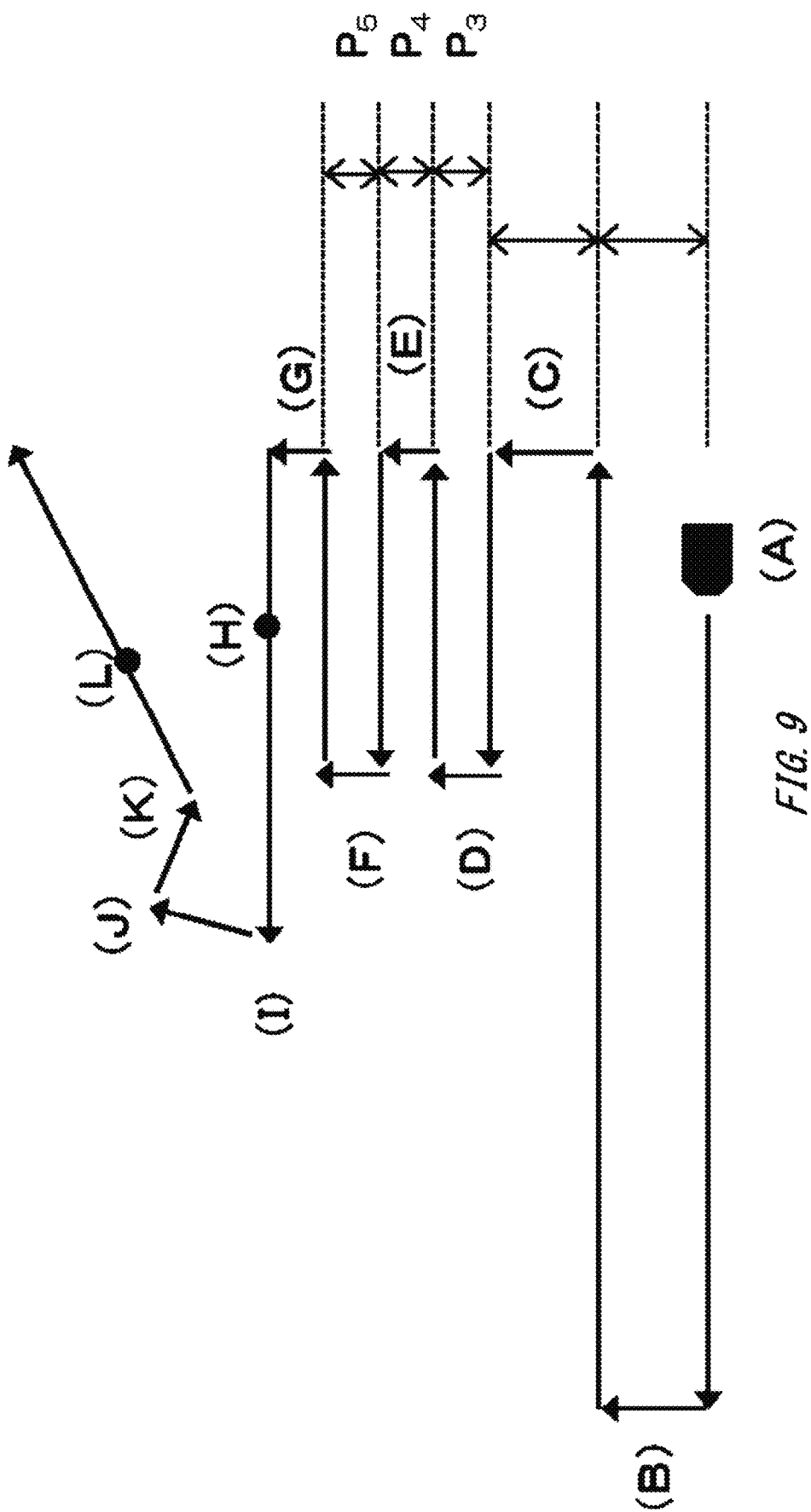
FIG. 9 schematically shows one example of the trajectory 800 of the lawn mower 210.

One example of the information processing in the control unit 380 will be described using FIG. 8 and FIG. 9. FIG. 8 schematically shows one example of a method to control the operation mode of the lawn mower 210. FIG. 9 schematically shows one example of the trajectory 800 of the lawn mower 210. In FIG. 8 and FIG. 9, each point from point (A) to point (L) represents a plurality of points located on the trajectory 800.

In FIG. 9, the distance $P_1$ between the trajectory from point (A) to point (B) and the trajectory from point (B) to point (C), and the distance $P_2$ between the trajectory from point (B) to point (C) and the trajectory from point (C) to point (D) are equal to each other. The distance $P_2$ between the trajectory from point (B) to point (C) and the trajectory from point (C) to point (D) is different from the distance $P_3$ between the trajectory from point (C) to point (D) and the trajectory from point (D) to point (E). The distance $P_3$ between the trajectory from point (C) to point (D) and the trajectory from point (D) to point (E), the distance $P_4$ between the trajectory from point (D) to point (E) and the trajectory from point (E) to point (F), and the distance $P_5$ between the trajectory from point (E) to point (F) and the trajectory from point (F) to point (G) are equal to each other.

In FIG. 8, the obstacle 802 is placed inside the work region 202. Due to the effect of the shadow of the obstacle 802, the sunshine condition of the subarea around the obstacle 802 is deteriorated. For example, in the present embodiment, the sunshine condition of the subarea 814 around the obstacle 802 is worse than that of the subarea 812 without the effect of the shadow of the obstacle 802, and the sunshine condition of the subarea 816 around the obstacle 802 is worse than that of the subarea 814. In FIG. 8, the subarea 814 is indicated with relatively thin hatched lines. In FIG. 8, the subarea 816 is indicated with relatively thick hatched lines.

According to the present embodiment, the lawn mower 210 passes point (A) and moves straight. The travel mode of the lawn mower 210 may be set to the mode in which the lawn mower 210 travels in a pattern in which lawn mower 210 travels by repeating straight moving and turning such that a plurality of parallel paths is arranged without gaps. In point (B), the lawn mower 210 detects a boundary to distinguish the inside and the outside of the work region 202. The change determination section 510 determines to change the advancing direction in response to the detection of the above-described boundary. For example, the change determination section 510 determines the advancing direction after turning such that the angle formed by the advancing direction of the lawn mower 210 before turning and the advancing direction of the lawn mower 210 after turning is approximately 180 degrees.

Likewise, the change determination section 510 may determine whether each of the advancing speed, the travel mode, and the work mode of the lawn mower 210 needs to be changed. In the present embodiment, the change determination section 510 determines not to change the advancing speed, the travel mode, and the work mode of the lawn mower 210. The lawn mower 210 moves straight after turning at point (B).

Then, at point (C), the lawn mower 210 detects the boundary to distinguish the inside and the outside of the work region 202. In response to the detection of the above-described boundary, the change determination section 510 determines to change the advancing direction. The change determination section 510 may determine the advancing direction after turning such that the angle formed by the advancing direction of the lawn mower 210 before turning and the advancing direction of the lawn mower 210 after turning is approximately 180 degrees.

Likewise, the change determination section 510 may determine whether each of the advancing speed, the travel mode, and the work mode of the lawn mower 210 needs to be changed. In the present embodiment, the change determination section 510 determines not to change the advancing speed, the travel mode, and the work mode of the lawn mower 210. The lawn mower 210 moves straight after turning at point (C).

Then, at point (D), the lawn mower 210 detects the boundary of the subarea 816 based on the illuminance information. More specifically, the comparison section 640 outputs the information indicating that (a) at least one of (i) the illuminance of the lawn mower 210 which is traveling and (ii) the illuminance of the region located on the advancing direction of the lawn mower 210 which is traveling is lower than (b) the illuminance indicated by at least one of one or more pieces of comparison information obtained by the comparison information obtaining section 630.

Then, the determination result generation section 650 determines whether the control parameter which defines the advancing direction of the lawn mower 210 needs to be changed based on the information output from the comparison section 640. In the present embodiment, the determination result generation section 650 outputs, as the determination result, the information indicating to change the control parameter which defines the advancing direction of the lawn mower 210.

Likewise, the determination result generation section 650 may determine whether each of the advancing speed, the travel mode, and the work mode of the lawn mower 210 needs to be changed. In the present embodiment, the determination result generation section 650 outputs, as the determination result, the information indicating to change the control parameter which defines the advancing speed of the lawn mower 210 and the control parameter which defines the travel mode of the lawn mower 210. Also, the determination result generation section 650 outputs, as the determination result, the information indicating not to change the control parameter which defines the work mode of the lawn mower 210.

The travel mode determination section 526 receives the information indicating the determination result of the determination result generation section 650 and starts the process to determine the travel mode after turning. For example, the travel mode determination section 526 determines to reduce the distance between the travel paths. The advancing speed determination section 524 receives the information indicating the determination result of the determination result generation section 650 and starts the process to determine the advancing speed after turning. For example, the advancing speed determination section 524 determines to reduce the advancing speed. The advancing direction determination section 522 receives the information indicating the determination result of the determination result generation section 650 and starts the process to determine the advancing direction after turning. For example, the advancing direction determination section 522 determines the advancing direction after turning such that the angle formed by the advancing direction of the lawn mower 210 before turning and the advancing direction of the lawn mower 210 after turning is approximately 180 degrees. The lawn mower 210 moves straight after turning at point (D).

Then, at point (E), the lawn mower 210 turns in the procedure similar to the procedure at point (C) and then moves straight. Then, at point (F), the lawn mower 210 turns in the procedure similar to the procedure at point (D) and then moves straight. Then, at point (G), the lawn mower 210 turns in the procedure similar to the procedure at point (C) and then moves straight.

Then, at point (H), the lawn mower 210 detects the boundary of the subarea 816 based on the illuminance information. More specifically, the comparison section 640 outputs the information indicating that (a) at least one of (i) the illuminance of the lawn mower 210 which is traveling and (ii) the illuminance of the region located on the advancing direction of the lawn mower 210 which is traveling is lower than (b) the illuminance indicated by at least one of one or more pieces of comparison information obtained by the comparison information obtaining section 630.

Then, the determination result generation section 650 determines whether the control parameter which defines the advancing direction of the lawn mower 210 needs to be changed based on the information output from the comparison section 640. In the present embodiment, the determination result generation section 650 outputs, as the determination result, the information indicating not to change the control parameter which defines the advancing direction of the lawn mower 210. The determination result generation section 650 may output, as the determination result, the information indicating not to change the control parameter which defines the advancing speed, the travel mode, and the work mode of the lawn mower 210. As a result, the lawn mower 210 continues moving straight to advance to the inside of the subarea 816.

Then, at point (I), the lawn mower 210 detects the boundary indicating the contour of the obstacle 802. In response to the detection of the above-described boundary, the change determination section 510 determines to change the advancing direction. In this time, the change determination section 510 may determine to change the travel mode. For example, the change determination section 510 sets the travel mode of the lawn mower 210 to the mode in which the lawn mower 210 turns in a random direction when a boundary is detected. The change determination section 510 determines the advancing direction after turn and moves straight after turning at point (I).

Then, at point (J), the lawn mower 210 detects the boundary of the subarea 816 based on the illuminance information. More specifically, the comparison section 640 outputs the information indicating that the illuminance of the region located on the advancing direction of the lawn mower 210 which is traveling is higher than the illuminance of the lawn mower 210 which is traveling.

Then, the determination result generation section 650 determines whether the control parameter which defines the advancing direction of the lawn mower 210 needs to be changed based on the information output from the comparison section 640. In the present embodiment, the determination result generation section 650 outputs, as the determination result, the information indicating to change the control parameter which defines the advancing direction of the lawn mower 210.

Likewise, the determination result generation section 650 may determine whether each of the advancing speed, the travel mode, and the work mode of the lawn mower 210 needs to be changed. In the present embodiment, the determination result generation section 650 determines not to change the advancing speed, the travel mode, and the work mode of the lawn mower 210. The lawn mower 210 moves straight after turning at point (J).

Then, at point (K), the lawn mower 210 turns in the procedure similar to the procedure at point (J) and then moves straight. In the present embodiment, as a result of turning at point (J), the lawn mower 210 enters the subarea 814 from the subarea 816.

Then, at point (L), the lawn mower 210 detects the boundary of the subarea 814 based on the illuminance information. More specifically, the comparison section 640 outputs the information indicating that the illuminance of the region located on the advancing direction of the lawn mower 210 which is traveling is higher than the illuminance of the lawn mower 210 which is traveling.

Then, the determination result generation section 650 determines whether the control parameter which defines the advancing direction of the lawn mower 210 needs to be changed based on the information output from the comparison section 640. In the present embodiment, the determination result generation section 650 outputs, as the determination result, the information indicating not to change the control parameter which defines the advancing direction of the lawn mower 210. As a result, the lawn mower 210 continues moving straight to enter the subarea 812 from the subarea 814.

Likewise, the determination result generation section 650 may determine whether each of the advancing speed, the travel mode and the work mode of the lawn mower 210 needs to be changed. In the present embodiment, the determination result generation section 650 determines not to change the advancing speed, the travel mode, and the work mode of the lawn mower 210.

Figure 10:
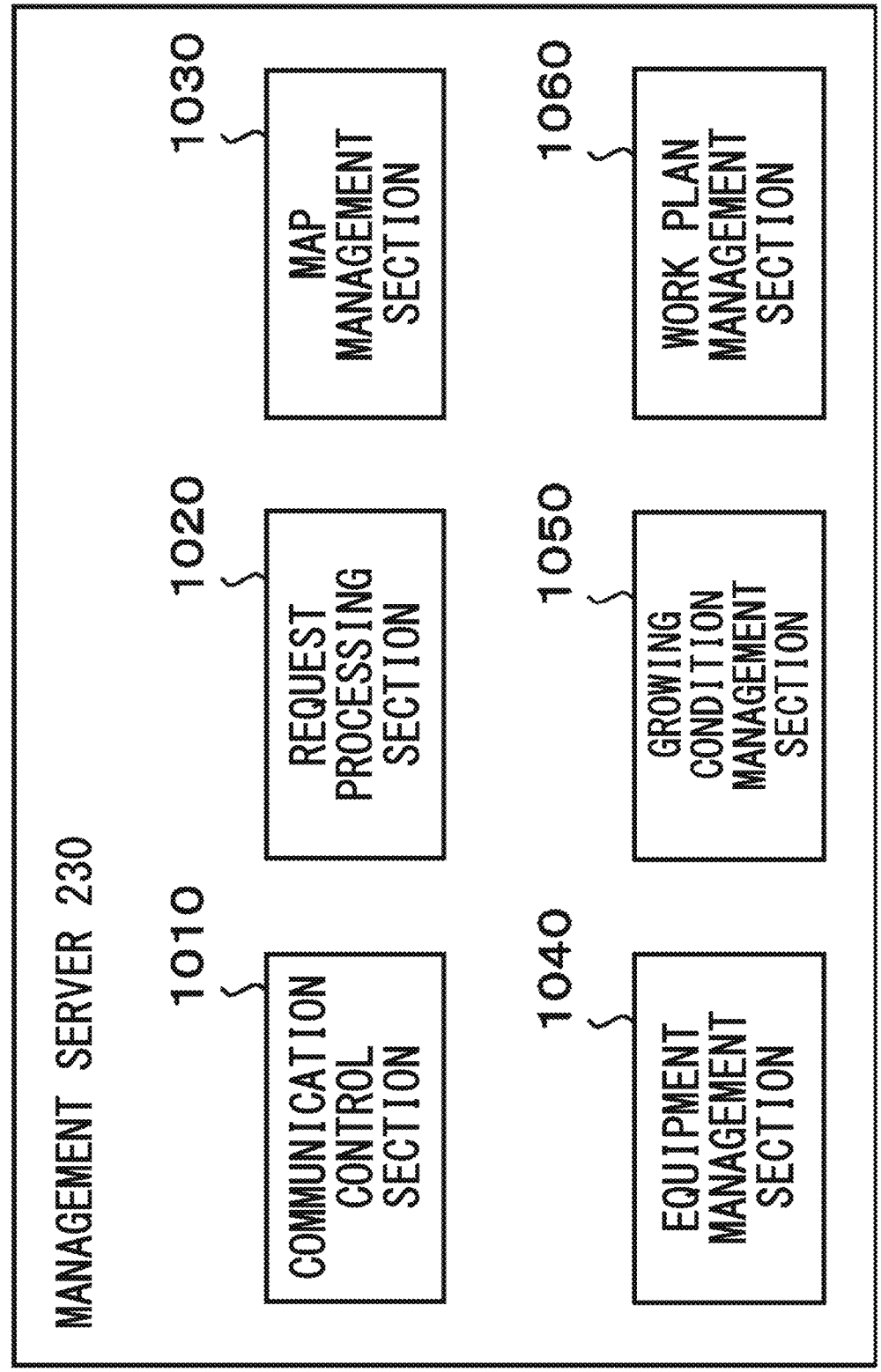
FIG. 10 schematically shows one example of the internal configuration of the management server 230.

FIG. 10 schematically shows one example of the internal configuration of the management server 230. In the present embodiment, the management server 230 includes the communication control section 1010, the request processing section 1020, the map management section 1030, the equipment management section 1040, the growing condition management section 1050, and the work plan management section 1060.

The map management section 1030 may be one example of the information processing apparatus, the image obtaining section, the sunshine condition determination section, and the map generation section. The work plan management section 1060 may be one example of the work schedule generation section.

In the present embodiment, the communication control section 1010 controls communication with the equipment outside the management server 230. The communication control section 1010 may be a communication interface compatible with one or more communication schemes. Examples of the external equipment includes the user terminal 22, the lawn mower 210, the image-capturing apparatus 220, the watering apparatus 240, and the like. In the present embodiment, the request processing section 1020 accepts the request from the external equipment. The request processing section 1020 processes the request from the external equipment.

In the present embodiment, the map management section 1030 manages the map information. For example, the map management section 1030 performs the process such as generating, updating, deleting, and searching of the map information. In one embodiment, the map management section 1030 manages the map information of all the subareas 204 included in the work region 202. In another embodiment, for the subarea 204 which is a part of the subareas 204 included in the work region 202, the map management section 1030 manages the map information of the subarea.

In the present embodiment, the map management section 1030 obtains, from the lawn mower 210, the data of the image of at least a part of the work region 202 captured by the image-capturing unit 364. The map management section 1030 may obtain, from the lawn mower 210, the information indicating the date and time when the image was captured. The map management section 1030 may obtain, from the lawn mower 210, the information indicating the weather condition when the image was captured.

In the present embodiment, the map management section 1030 obtains, from the image-capturing apparatus 220, the data of the image of at least a part of the work region 202 captured by the image-capturing apparatus 220. The map management section 1030 may obtain, from the image-capturing apparatus 220, the information indicating the date and time when the image was captured. The map management section 1030 may obtain, from the image-capturing apparatus 220, the information indicating the weather condition when the image was captured.

The map management section 1030 may obtain the data indicating at least one of the amount of solar radiation and the illuminance on the top surface of the lawn mower 210 from the illuminance sensor 366 of the lawn mower 210. The map management section 1030 may obtain, from the image-capturing apparatus 220, the data indicating at least one of the amount of solar radiation and the illuminance in the location where the image-capturing apparatus 220 is placed. The map management section 1030 may obtain, from the watering apparatus 240, the data indicating at least one of the amount of solar radiation and the illuminance in the location where the watering apparatus 240 is placed.

In the present embodiment, for each of a plurality of subareas 204 included in the work region 202, the map management section 1030 determines the sunshine condition in the subarea. For example, for each of a plurality of subarea 204 included in the work region 202, the map management section 1030 calculates the illuminance parameter indicating the sunshine condition in the subarea. As one example of the illuminance parameter, (i) the statistical value of the amount of solar radiation [$W/m^2$] in a predetermined period, (ii) the statistical value of the sunshine duration [hour/day] in a predetermined period, (iii) the statistical value of the accumulated amount of solar radiation [$MJ/m^2$] per unit period in a predetermined period, and the like are exemplified.

The sunshine duration is defined as a period in which an amount of immediate solar radiation measured by a sunshine meter is equal to or more than a predetermined threshold in one day. The predetermined threshold is, for example, 120 W/m² in Japan. It is noted that the predetermined threshold may be different depending on countries or regions. Examples of a predetermined period include one week, 10 days, one month, three months, six months, and the like. Examples of unit period include one hour, three hours, six hours, nine hours, one day, one week, 10 days, one month, and the like.

The illuminance parameter may be represented with continuous values or may be represented with a stepwise segmentation. For example, the illuminance parameter represented with continuous values is evaluated with n-step evaluations (n is an integer equal to or greater than two), an evaluation function, a learning device, and the like so that the illuminance parameter is represented with a stepwise segmentation.

The map management section 1030 may calculate the illuminance parameter for each predetermined period. The map management section 1030 may calculate the illuminance parameter of each subarea for each type of weather. Examples of the type of weather include sunny, cloudy, rainy, snowy, and the like.

It is noted that as long as the illuminance parameter may be a parameter related to the amount of solar radiation or the sunshine duration, the calculation method of it is not specifically limited. As another example of the illuminance parameter, (iv) the statistical value of ratio (A/B) of (A) the amount of solar radiation of the target subarea 204 [W/m²] to (B) the amount of solar radiation at a particular point inside or in the vicinity of the particular subarea 204 or the work region 202 in a predetermined period [W/m²], (v) the statistical value of the ratio (C/D) of (C) the sunshine duration of the target subarea 204 [hour/day] to (D) the sunshine duration at a particular point inside or in the vicinity of the particular subarea 204 or the work region 202 in a predetermined period [hour/day], (vi) the statistical value of the ratio (E/F) of (E) the accumulated amount of solar radiation per unit period of the target subarea 204 [MJ/m²] to (F) the accumulated amount of solar radiation per unit period at a particular point inside or in the vicinity of the particular subarea 204 or the work region 202 in a predetermined period [MJ/m²], and the like.

The illuminance parameter may be calculated based on a combination of at least one of the amount of solar radiation, the sunshine duration, and the accumulated amount of solar radiation per unit period, and another factor related to the weather condition. Examples of another factor related to the weather condition include the type of weather, the temperature, the humidity, the wind speed, the wind direction, and the like.

The map management section 1030 may analyze each of a plurality of images captured by the lawn mower 210 and the image-capturing apparatus 220 to calculate the illuminance parameter. The map management section 1030 may calculate the illuminance parameter based on the analysis result of a plurality of images captured by at least one of the lawn mower 210 and the image-capturing apparatus 220, and the data indicating at least one of the amount of solar radiation and the illuminance obtained by at least one of the illuminance sensor 366 of the lawn mower 210, the image-capturing apparatus 220, and the watering apparatus 240.

In one embodiment, the map management section 1030 first analyzes each of a plurality of images captured by the lawn mower 210 and the image-capturing apparatus 220 to recognize one or more subareas 204 in each image. The map management section 1030 may identify the identification information and the location and range in each image for each of one or more subareas 204 included in each image. Then, the map management section 1030 determines the brightness of each of one or more subareas 204 included in each image. The brightness in each of one or more subareas 204 may be represented with continuous values or may be represented with a stepwise segmentation.

Thereby, for each of a plurality of subareas 204 included in the work region 202, the database which associates the identification information of the subarea and the information indicating the brightness of the subarea is created. The map management section 1030 can calculate various types of sunshine parameters based on the information stored in the above-described database.

In another embodiment, the map management section 1030 first analyzes each of a plurality of images captured by the lawn mower 210 and the image-capturing apparatus 220 and divides each image into a plurality of regions based on a level of brightness. Then, the map management section 1030 recognizes one or more subareas 204 included in each of a plurality of regions of each image. The map management section 1030 may identify the identification information of each of one or more subareas 204 included in each region. For each of one or more subareas 204 included in each region, the map management section 1030 may calculate a ratio of the area of a part included in the region to the area of the subarea.

Thereby, for each of a plurality of subareas 204 included in the work region 202, the database which associates the identification information of the subarea and the information indicating the brightness of the subarea is created. The map management section 1030 can calculate various types of sunshine parameters based on the information stored in the above-described database.

In the present embodiment, the equipment management section 1040 manages various types of equipment which configures the management system 200. For example, the equipment management section 1040 controls at least one of the lawn mower 210, the image-capturing apparatus 220, and the watering apparatus 240. The equipment management section 1040 may manage the information related to the various types of equipment related to the management system 200. For example, the equipment management section 1040 obtains, from at least one of the lawn mower 210, the image-capturing apparatus 220, and the watering apparatus 240, the information related to the state of the equipment. The equipment management section 1040 may manage the information related to the user terminal 22.

In the present embodiment, the growing condition management section 1050 manages the information related to the growing condition of the lawn 12. The growing condition management section 1050 may manage the information related to the growing condition of the lawn 12 in each of a plurality of subareas 204 included in the work region 202. The growing condition management section 1050 may manage the information related to the growing condition of the lawn 12 in at least one of a plurality of subareas 204 included in the work region 202.

Examples of the growing condition of the lawn 12 include the growing stage of the lawn 12, the growing status of the lawn 12, and the like. Examples of the information indicating the growing status of the lawn 12 include the color of the lawn 12, the thickness of the lawn 12, the density of the lawn 12, and the like. It can be expected that the load of the work unit 320 increases as the lawn 12 grows better. Therefore, the information indicating the growing status of the lawn 12 may be the information indicating the load of the work unit 320. Examples of the load of the work unit 320 include the load of the work motor 326, the wearing condition of the cutter blade 324, and the like.

The growing condition management section 1050 may manage the information related to the growing environment of the lawn 12. Examples of the growing environment of the lawn 12 include the information related to the soil of the subarea 204, and the like.

In the present embodiment, the work plan management section 1060 manages the schedule of the work performed by the lawn mower 210. The work plan management section 1060 may plan the work schedule of the lawn mower 210. The work plan management section 1060 may manage the progress of the work schedule of the lawn mower 210. The work plan management section 1060 may plan the work schedule of the watering apparatus 240. The work plan management section 1060 may manage the progress of the work schedule of the watering apparatus 240.

The work plan management section 1060 may plan the work schedule based on the illuminance parameter of each of a plurality of subareas 204 included in the work region 202. The work schedule may be the information which associates (i) the identification information indicating each of a plurality of subareas 204, (ii) a timing at which the work related to the growing of the lawn 12 is performed in the subarea, and (iii) at least one of the type and intensity of the work in the subarea. The type of work may be at least one of seeding, pruning, lawn mowing, grass cutting, watering, fertilizing, soiling, weeding, and the like. The work plan management section 1060 may update the work schedule based on the information obtained by the growing condition management section 1050.

While the embodiments of the present invention have been described, the technical scope of the invention is not limited to the above described embodiments. It is apparent to persons skilled in the art that various alterations and improvements can be added to the above-described embodiments. Also, matters explained with reference to a particular embodiment can be applied to other embodiments as long as as long as there is no technical contradiction. For example, what is described for an embodiment of the FIG. 1 can be applied to another embodiment described with reference to another drawing. It is also apparent from the scope of the claims that the embodiments added with such alterations or improvements can be included in the technical scope of the invention.

The operations, procedures, steps, and stages of each process performed by an apparatus, system, program, and method shown in the claims, the specification, or diagrams can be performed in any order as long as the order is not indicated by "prior to," "before," or the like and as long as the output from a previous process is not used in a later process. Even if the operation flow is described using phrases such as "first" or "then" in the claims, the specification, or diagrams, it does not necessarily mean that the process must be performed in this order.

For example, the following matters are disclosed in the present specification.

[Item 1-1]

A control apparatus to control a work machine with an autonomous movement function, comprising:
an illuminance information obtaining section to obtain illuminance information indicating at least one of (i) an illuminance of the work machine in motion and (ii) an illuminance of a region located on an advancing direction of the work machine in motion; and
a control section to control at least one of an advancing direction, an advancing speed, a travel mode, and a work mode of the work machine based on the illuminance information obtained by the illuminance information obtaining section.

[Item 1-2]

The control apparatus according to Item 1-1, wherein the control section has an instruction output section which outputs an instruction to change an advancing direction of the work machine if at least one of (i) an illuminance of the work machine and (ii) an illuminance of a region located on an advancing direction of the work machine which are indicated by the illuminance information obtained by the illuminance information obtaining section satisfy a predetermined condition.

[Item 1-3]

The control apparatus according to Item 1-1, wherein
the control section includes:
a change determination section which determines whether to change an advancing direction of the work machine based on a predetermined algorithm if at least one of (i) an illuminance of the work machine in motion and (ii) an illuminance of a region located on an advancing direction of the work machine in motion which are indicated by the illuminance information obtained by the illuminance information obtaining section satisfy a predetermined condition; and
an instruction output section to output an instruction to change an advancing direction of the work machine if the change determination section determines to change an advancing direction of the work machine.

[Item 1-4]

The control apparatus according to Item 1-3, wherein
the change determination section determines whether to change an advancing direction of the work machine based on a probability model, and
the probability model is designed such that a probability that an advancing direction is changed increases as (i) an illuminance of the work machine in motion or (ii) an illuminance of a region located on the advancing direction of the work machine in motion decreases.

[Item 1-5]

The control apparatus according to Item 1-3, wherein
the change determination section determines whether to change an advancing direction of the work machine based on a probability model, and
a probability that the advancing direction is changed in the probability model is defined based on a sunshine condition of each location within a work region of the work machine.

[Item 1-6]

The control apparatus according to any one of Item 1-1 to Item 1-5, further comprising a load information obtaining section which obtains load information indicating a load of the work machine which is working, wherein
the control section controls at least one of an advancing direction, an advancing speed, a travel mode, and a work mode of the work machine based on the illuminance information obtained by the illuminance information obtaining section and the load information obtained by the load information obtaining section.

[Item 1-7]

A program which enables a computer to serve as a control apparatus according to any one of Item 1-1 to Item 1-6.

[Item 1-8]

An autonomously traveling work machine, comprising:
a control apparatus according to any one of Item 1-1 to Item 1-6; and an illuminance sensor to measure at least one of (i) an illuminance of the work machine and (ii) an illuminance of a region located on an advancing direction of the work machine.

[Item 2-1]

An information processing apparatus, including an image obtaining section to obtain, from an image capturing section which captures at least a part of a work region where a plant is growing, data of the at least part of an image of the work region; and a sunshine condition determination section to analyze the data obtained by the image obtaining section and determine a sunshine condition in each of a plurality of subareas included in the at least part of the work region.

[Item 2-2]

The information processing apparatus according to Item 2-1, further including a map generation section which generates map information in which an identification information indicating each of the plurality of subareas based on a sunshine condition in each subarea of the work region determined by the sunshine condition determination section and the information indicating the sunshine condition in the subarea are associated.

[Item 2-3]

The information processing apparatus according to Item 2-1 or Item 2-2, further including a work schedule generation section to generate work schedule information in which (i) identification information indicating each of the plurality of subareas, (ii) a timing to perform a work related to a growing of the plant in the subarea, (iii) at least one of a type and intensity of the work in the subarea are associated based on a sunshine condition in each subarea of the work region determined by the sunshine condition determination section.

[Item 2-4]

The information processing apparatus according to Item 2-3, wherein the type of work is at least one of seeding, pruning, lawn mowing, grass cutting, watering, fertilizing, soiling, and weeding.

[Item 2-5]

The information processing apparatus according to Item 2-3 or Item 2-4, further including a growing condition obtaining section to obtain information indicating a real growing condition of the plant in at least one of the plurality of subareas, wherein the work schedule generation section update the work schedule information based on the information obtained by the growing condition obtaining section.

[Item 2-6]

The information processing apparatus according to Item 2-5, wherein the information indicating a real growing condition of the plant is information indicating the load of a work section which is mounted on an autonomously moving work machine and performs the work.

[Item 2-7]

The information processing apparatus according to any one of Item 2-3 to Item 2-5, further including a control section to control a work machine which performs a work in the work region based on the work schedule information generated by the work schedule generation section.

[Item 2-8]

A program to enable a computer to serve as the information processing apparatus according to any one of Item 2-1 to Item 2-7.

EXPLANATION OF REFERENCES 10 region, 12 lawn, 20 communication network, 22 user terminal, 150 work machine, 162 illuminance sensor, 164 illuminance sensor, 180 control apparatus, 182 illuminance information obtaining section, 184 control section, 200 management system, 202 work region, 204 subarea, 210 lawn mower, 220 image-capturing apparatus, 230 management server, 240 watering apparatus, 302 housing, 312 front wheel, 314 back wheel, 316 travel motor, 320 work unit, 322 blade disk, 324 cutter blade, 326 work motor. 328 shaft, 330 position adjustment section, 340 battery unit, 350 user interface, 364 image-capturing unit, 366 illuminance sensor, 370 sensor unit, 380 control unit, 410 communication control section, 420 travel control section, 430 work unit control section, 440 input/output control section, 450 control parameter determination section, 460 storage section, 510 change determination section, 520 parameter determination section, 522 advancing direction determination section, 524 advancing speed determination section, 526 travel mode determination section, 528 work mode determination section, 620 image analysis section, 630 comparison information obtaining section, 640 comparison section, 650 determination result generation section, 710 change determination section, 722 position estimation section, 724 extracting section, 800 trajectory, 802 obstacle, 812 subarea, 814 subarea, 816 subarea, 1010 communication control section, 1020 request processing section, 1030 map management section, 1040 equipment management section, 1050 growing condition management section, 1060 work plan management section

What is claimed is:

1. A control apparatus to control a work machine with an autonomous movement function, comprising:

at least one processor;

an illuminance information obtaining section to obtain illuminance information indicating at least one of (i) an illuminance of the work machine in motion and (ii) an illuminance of a region located on an advancing direction of the work machine in motion, using the at least one processor; and a control section to control at least one of an advancing direction, an advancing speed, a travel mode, and a work mode of the work machine according to the illuminance information obtained by the illuminance information obtaining section, using the at least one processor, wherein the control section includes:

a change determination section which determines whether to change at least one of the advancing direction, the advancing speed, the travel mode, and the work mode of the work machine if the illuminance information obtained by the illuminance information obtaining section satisfies a predetermined condition, using the at least one processor; and an instruction output section to output an instruction to change the at least one of the advancing direction, the advancing speed, the travel mode, and the work mode of the work machine if the change determination section determines to change the at least one of the advancing direction, the advancing speed, the travel mode, and the work mode of the work machine, using the at least one processor.

2. The control apparatus according to claim 1, wherein the instruction output section outputs an instruction to change the advancing direction of the work machine if at least one of (i) an illuminance of the work machine and (ii) an illuminance of a region located on an advancing direction of the work machine which are indicated by the illuminance information obtained by the illuminance information obtaining section satisfy the predetermined condition.

3. The control apparatus according to claim 1, wherein the change determination section determines whether to change the advancing direction of the work machine based on a predetermined algorithm if at least one of (i) an illuminance of the work machine in motion and (ii) an illuminance of a region located on an advancing direction of the work machine in motion which are indicated by the illuminance information obtained by the illuminance information obtaining section satisfy the predetermined condition, using the at least one processor; and the instruction output section outputs an instruction to change the advancing direction of the work machine if the change determination section determines to change the advancing direction of the work machine, using the at least one processor.

4. The control apparatus according to claim 3, wherein the change determination section determines whether to change the advancing direction of the work machine based on a probability model, and the probability model is designed such that a probability that an advancing direction is changed increases as (i) an illuminance of the work machine in motion or (ii) an illuminance of a region located on the advancing direction of the work machine in motion decreases.

5. The control apparatus according to claim 3, wherein the change determination section determines whether to change the advancing direction of the work machine based on a probability model, and a probability that the advancing direction is changed in the probability model is defined based on a sunshine condition of each location within a work region of the work machine.

6. The control apparatus according to claim 1, further comprising a load information obtaining section which obtains load information indicating a load of the work machine which is working, using the at least one processor, wherein the control section controls at least one of the advancing direction, the advancing speed, the travel mode, and the work mode of the work machine based on the illuminance information obtained by the illuminance information obtaining section and the load information obtained by the load information obtaining section.

7. A non-transitory computer readable storage medium which stores a program of a control apparatus to control a work machine with an autonomous movement function, wherein the program enables a computer to perform:

an illuminance information obtaining procedure to obtain illuminance information indicating at least one of (i) an illuminance of the work machine in motion and (ii) an illuminance of a region located on an advancing direction of the work machine in motion, using the computer; and a control procedure to control at least one of an advancing direction, an advancing speed, a travel mode, and a work mode of the work machine according to the illuminance information obtained in the illuminance information obtaining procedure, using the computer, wherein the control procedure includes:

a change determination procedure which determines whether to change at least one of the advancing direction, the advancing speed, the travel mode, and the work mode of the work machine if the illuminance information obtained by the illuminance information obtaining procedure satisfies a predetermined condition, using the computer; and an instruction output procedure to output an instruction to change the at least one of the advancing direction, the advancing speed, the travel mode, and the work mode of the work machine if the change determination procedure determines to change the at least one of the advancing direction, the advancing speed, the travel mode, and the work mode of the work machine, using the computer.

8. A work machine which is configured to autonomously travel, comprising:

the control apparatus according to claim 1; and an illuminance sensor to measure at least one of (i) an illuminance of the work machine and (ii) an illuminance of a region located on an advancing direction of the work machine.

9. The work machine according to claim 8, wherein the instruction output section outputs an instruction to change the advancing direction of the work machine if at least one of (i) an illuminance of the work machine and (ii) an illuminance of a region located on an advancing direction of the work machine which are indicated by the illuminance information obtained by the illuminance information obtaining section satisfy the predetermined condition.

10. The work machine according to claim 8, wherein the change determination section determines whether to change the advancing direction of the work machine based on a predetermined algorithm if at least one of (i) an illuminance of the work machine in motion and (ii) an illuminance of a region located on an advancing direction of the work machine in motion which are indicated by the illuminance information obtained by the illuminance information obtaining section satisfy the predetermined condition, using the at least one processor; and the instruction output section outputs an instruction to change the advancing direction of the work machine if the change determination section determines to change the advancing direction of the work machine, using the at least one processor.

11. The control apparatus according to claim 1, wherein the control section controls the travel mode of the work machine according to the illuminance information obtained by the illuminance information obtaining section, the travel mode defines at least one of (i) a travel pattern and (ii) a distance between travel paths next to each other, and the control section determines, based on the illuminance information, whether to change a control parameter for controlling the travel mode, and determines, based on the illuminance information, the at least one of (i) the travel pattern and (ii) the distance between travel paths next to each other after change when it is determined to change the control parameter.

12. A control method to control a work machine with an autonomous movement function, comprising:

an illuminance information obtaining step to obtain illuminance information indicating at least one of (i) an illuminance of the work machine in motion and (ii) an illuminance of a region located on an advancing direction of the work machine in motion;

a controlling step to control at least one of an advancing direction, an advancing speed, a travel mode, and a work mode of the work machine according to the illuminance information obtained by the illuminance information obtaining step, wherein the control step includes:

a change determination step which determines whether to change at least one of the advancing direction, the advancing speed, the travel mode, and the work mode of the work machine if the illuminance information obtained by the illuminance information obtaining step satisfies a predetermined condition; and an instruction output step to output an instruction to change the at least one of the advancing direction, the advancing speed, the travel mode, and the work mode of the work machine if the change determination step determines to change the at least one of the advancing direction, the advancing speed, the travel mode, and the work mode of the work machine.

13. The control method according to claim 12, wherein the instruction output step outputs an instruction to change the advancing direction of the work machine if at least one of (i) an illuminance of the work machine and (ii) an illuminance of a region located on an advancing direction of the work machine which are indicated by the illuminance information obtained in the illuminance information obtaining step satisfy the predetermined condition.

14. The control method according to claim 12, wherein
the change determining step determines whether to change the advancing direction of the work machine based on a predetermined algorithm if at least one of (i) an illuminance of the work machine in motion and (ii) an illuminance of a region located on an advancing direction of the work machine in motion which are indicated by the illuminance information obtained in the illuminance information obtaining step satisfy the predetermined condition; and the instruction output step outputs an instruction to change the advancing direction of the work machine if the advancing direction of the work machine is determined to be changed in the change determining step.

* * * * *